US011799197B2

(12) United States Patent
Yang et al.

(10) Patent No.: US 11,799,197 B2
(45) Date of Patent: Oct. 24, 2023

(54) LIQUID CRYSTAL ANTENNA AND PREPARATION METHOD THEREOF

(71) Applicant: Chengdu Tianma Microelectronics Co., Ltd., Chengdu (CN)

(72) Inventors: Zuocai Yang, Chengdu (CN); Qinyi Duan, Chengdu (CN); Ning He, Chengdu (CN); Kerui Xi, Chengdu (CN); Zhenyu Jia, Chengdu (CN); Yunhua Liu, Chengdu (CN); Donghua Wang, Chengdu (CN); Yingru Hu, Chengdu (CN)

(73) Assignee: Chengdu Tianma Microelectronics Co., Ltd., Chengdu (CN)

( * ) Notice: Subject to any disclaimer, the term of this patent is extended or adjusted under 35 U.S.C. 154(b) by 6 days.

(21) Appl. No.: 17/716,304

(22) Filed: Apr. 8, 2022

(65) Prior Publication Data

US 2022/0231407 A1 Jul. 21, 2022

(30) Foreign Application Priority Data

Dec. 31, 2021 (CN) ......................... 202111673857.6

(51) Int. Cl.

| | |
|---|---|
| ***H01Q 9/04*** | (2006.01) |
| ***H01Q 21/00*** | (2006.01) |
| ***G02F 1/133*** | (2006.01) |
| ***H01Q 1/36*** | (2006.01) |

(52) U.S. Cl.
CPC ............. *H01Q 1/36* (2013.01); *H01Q 9/0407* (2013.01)

(58) Field of Classification Search
CPC ...... H01Q 9/04; H01Q 9/0407; H01Q 9/0457; H01Q 1/36; H01Q 21/00; H01Q 21/065; H01Q 3/34; G02F 1/1313; G02F 1/133; G02F 1/1333
See application file for complete search history.

(56) References Cited

U.S. PATENT DOCUMENTS

| | | | | |
|---|---|---|---|---|
| 2019/0294007 | A1* | 9/2019 | Wang | G02F 1/1343 |
| 2020/0243969 | A1* | 7/2020 | Fang | H01Q 3/36 |
| 2021/0210852 | A1* | 7/2021 | Liu | H01P 1/18 |
| 2021/0234268 | A1* | 7/2021 | Liu | G02F 1/1313 |
| 2021/0328355 | A1* | 10/2021 | Xi | H01Q 5/357 |

FOREIGN PATENT DOCUMENTS

| | | | |
|---|---|---|---|
| CN | 108761862 | A | 11/2018 |
| CN | 110034358 | A | 7/2019 |
| CN | 213655379 | U | 7/2021 |

* cited by examiner

*Primary Examiner* — Thai Pham
(74) *Attorney, Agent, or Firm* — KDW Firm PLLC

(57) ABSTRACT

Provided are a liquid crystal antenna and a preparation method of the liquid crystal antenna. The liquid crystal antenna includes a liquid crystal cell and the liquid crystal cell includes a first substrate, a second substrate, a microstrip line, a ground metal layer, a liquid crystal layer, and frame glue. The liquid crystal antenna further includes a third substrate, a fourth substrate, and a radiation electrode. The third substrate extends beyond an edge of the first substrate. The fourth substrate extends beyond edges of the second substrate on at least two sides. A connection structure is disposed between the third substrate and the fourth substrate, and the connection structure is disposed on an outer side of the frame glue. The liquid crystal antenna and the preparation method of the liquid crystal antenna are provided to reduce preparation difficulty and improve reliability.

20 Claims, 13 Drawing Sheets

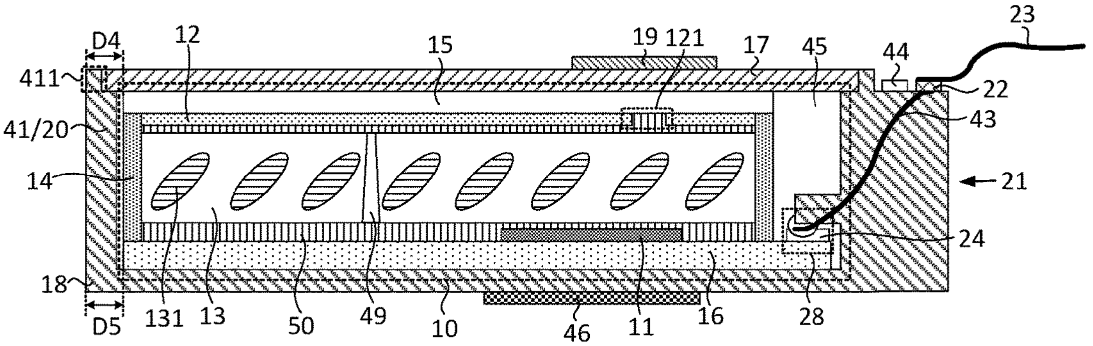

FIG. 20

Prepare a liquid crystal cell, where the liquid crystal cell includes frame glue, a microstrip line, a ground metal layer, a liquid crystal layer, and a first substrate and a second substrate disposed opposite to each other, the microstrip line is disposed on a side of the second substrate facing the first substrate, the ground metal layer is disposed on a side of the first substrate facing the second substrate, the liquid crystal layer is disposed between the first substrate and the second substrate, the frame glue is disposed between the first substrate and the second substrate, and the frame glue is disposed around the liquid crystal layer — S110

↓

Provide a third substrate and a fourth substrate and prepare a radiation electrode on a side of the third substrate — S120

↓

Combine the third substrate, the fourth substrate, and the liquid crystal cell to form a liquid crystal antenna, where the third substrate is disposed on a side of the first substrate facing away from the second substrate, the fourth substrate is disposed on a side of the second substrate facing away from the third substrate, the radiation electrode is disposed on a side of the third substrate facing away from the fourth substrate, the third substrate extends beyond an edge of the first substrate, the fourth substrate extends beyond edges of the second substrate on at least two sides, a connection structure is disposed between the third substrate and the fourth substrate, and the connection structure is disposed on an outer side of the frame glue — S130

FIG. 21

LIQUID CRYSTAL ANTENNA AND PREPARATION METHOD THEREOF

CROSS-REFERENCE TO RELATED APPLICATION

This application claims priority to Chinese Patent Application No. 202111673857.6 filed Dec. 31, 2021, the disclosure of which is incorporated herein by reference in its entirety.

TECHNICAL FIELD

The present disclosure relates to the field of communication technologies and, in particular, to a liquid crystal antenna and a preparation method thereof.

BACKGROUND

A liquid crystal antenna is a novel arrayed antenna manufactured by combining a conventional patch antenna and a liquid crystal phase shifter. The liquid crystal phase shifter adjusts a phase of a radio frequency signal by controlling the deflection of liquid crystal molecules. The liquid crystal antennas have broad application prospects in fields of satellite receiving antennas, on-board radars, 5G base station antennas and the like.

However, existing liquid crystal antennas are difficult to prepare and lack of reliability.

SUMMARY

The present disclosure provides a liquid crystal antenna and a preparation method of the liquid crystal antenna to reduce preparation difficulty and improve reliability.

In a first aspect, embodiments of the present disclosure provide a liquid crystal antenna.

The liquid crystal antenna includes a liquid crystal cell.

The liquid crystal cell includes a first substrate, a second substrate, a microstrip line, a ground metal layer, a liquid crystal layer, and frame glue.

The first substrate and the second substrate are disposed opposite to each other.

The microstrip line is disposed on a side of the second substrate facing the first substrate.

The ground metal layer is disposed on a side of the first substrate facing the second substrate.

The liquid crystal layer is disposed between the first substrate and the second substrate.

The frame glue is disposed between the first substrate and the second substrate and around the liquid crystal layer.

The liquid crystal antenna further includes a third substrate, a fourth substrate, and a radiation electrode.

The third substrate is disposed on a side of the first substrate facing away from the second substrate, and the fourth substrate is disposed on a side of the second substrate facing away from the third substrate.

The radiation electrode is disposed on a side of the third substrate facing away from the fourth substrate.

The third substrate extends beyond an edge of the first substrate, the fourth substrate extends beyond edges of the second substrate on at least two sides, a connection structure is disposed between the third substrate and the fourth substrate, and the connection structure is disposed on an outer side of the frame glue.

In a second aspect, embodiments of the present disclosure further provide a preparation method of a liquid crystal antenna. The method includes the steps described below.

A liquid crystal cell is prepared. The liquid crystal cell includes frame glue, a microstrip line, a ground metal layer, a liquid crystal layer, and a first substrate and a second substrate disposed opposite to each other. The microstrip line is disposed on a side of the second substrate facing the first substrate. The ground metal layer is disposed on a side of the first substrate facing the second substrate. The liquid crystal layer is disposed between the first substrate and the second substrate. The frame glue is disposed between the first substrate and the second substrate, and the frame glue is disposed around the liquid crystal layer.

A third substrate and a fourth substrate are provided and a radiation electrode is prepared on a side of the third substrate.

The third substrate, the fourth substrate, and the liquid crystal cell are combined so that a liquid crystal antenna is formed. The third substrate is disposed on a side of the first substrate facing away from the second substrate. The fourth substrate is disposed on a side of the second substrate facing away from the third substrate. The radiation electrode is disposed on a side of the third substrate facing away from the fourth substrate. The third substrate extends beyond an edge of the first substrate. The fourth substrate extends beyond edges of the second substrate on at least two sides. A connection structure is disposed between the third substrate and the fourth substrate, and the connection structure is disposed on an outer side of the frame glue.

BRIEF DESCRIPTION OF DRAWINGS

FIG. 20 is a sectional view showing part of another liquid crystal antenna according to an embodiment of the present disclosure;

FIG. 21 is a flowchart of a preparation method of a liquid crystal antenna according to an embodiment of the present disclosure;

DETAILED DESCRIPTION

Figure 1:
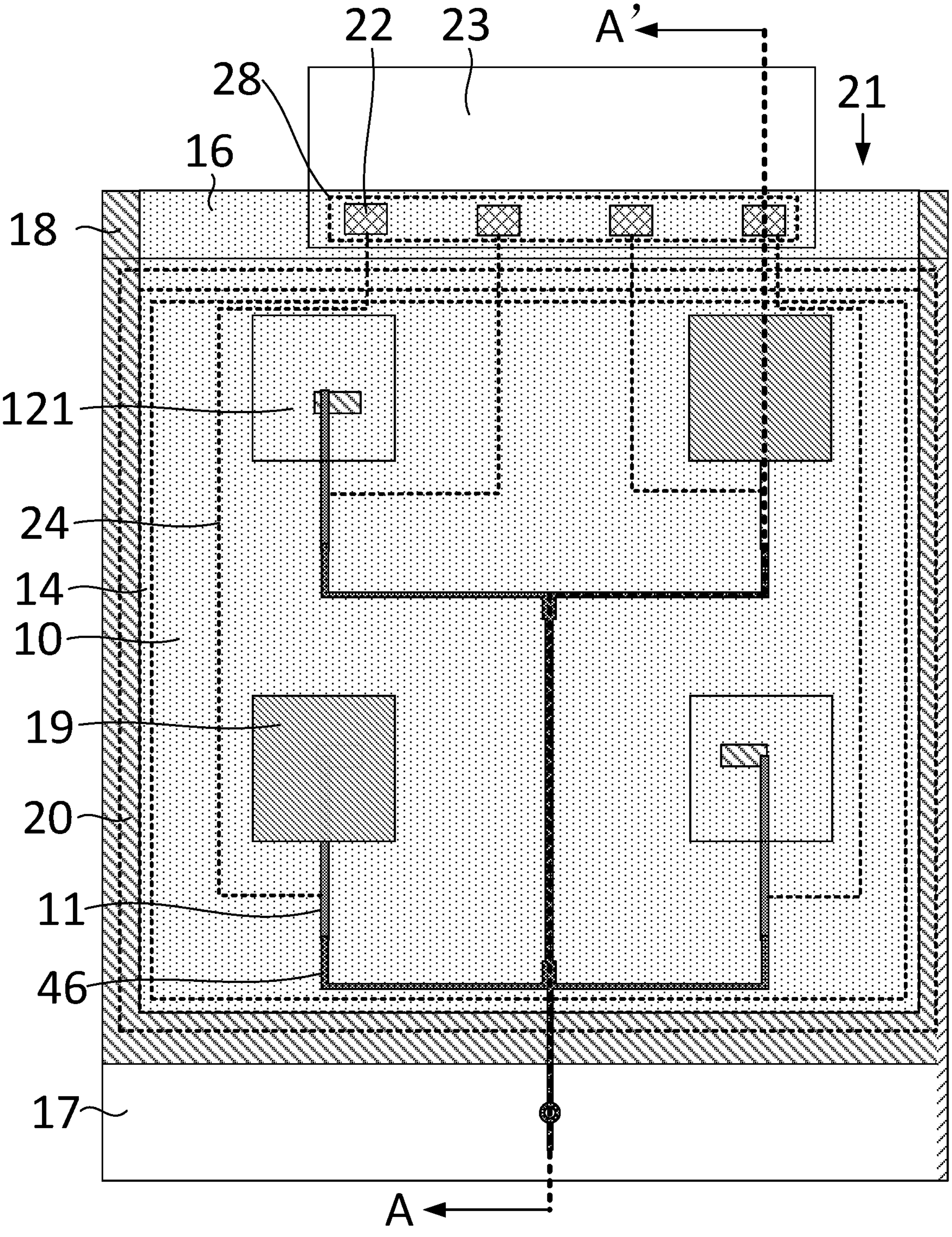
FIG. 1 is a structure view of a liquid crystal antenna according to an embodiment of the present disclosure.

The present disclosure is further described hereinafter in detail in conjunction with drawings and embodiments. It is to be understood that embodiments described hereinafter are intended to explain the present disclosure and not to limit the present disclosure. Additionally, it is to be noted that for ease of description, merely part, not all, of structures related to the present disclosure are illustrated in the drawings.

Figure 2:
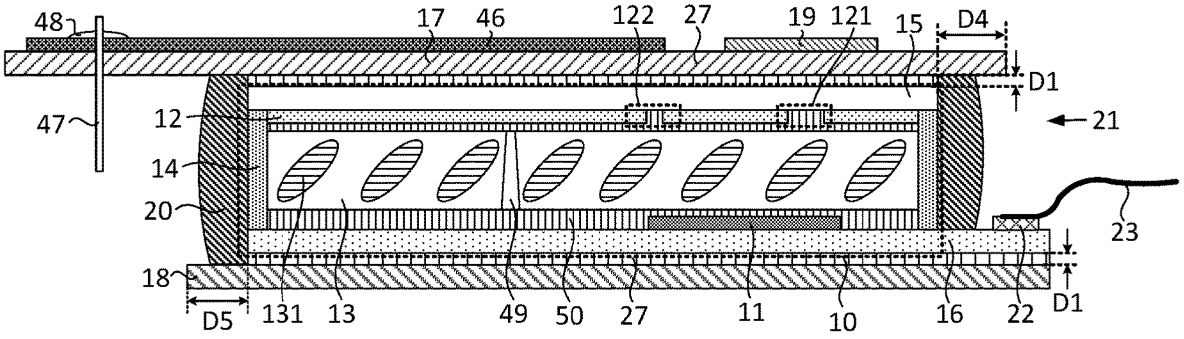
FIG. 2 is a sectional view of FIG. 1 taken along an A-A' direction.

FIG. 1 is a structure view of a liquid crystal antenna according to an embodiment of the present disclosure. FIG. 2 is a sectional view of FIG. 1 taken along an A-A' direction. As shown in FIGS. 1 and 2, a liquid crystal antenna provided by the embodiments of the present disclosure includes a liquid crystal cell 10. The liquid crystal cell 10 includes a microstrip line 11, a ground metal layer 12, a liquid crystal layer 13, frame glue 14, and a first substrate 15 and a second substrate 16 disposed opposite to each other. The microstrip line 11 is disposed on a side of the second substrate 16 facing the first substrate 15. The ground metal layer 12 is disposed on a side of the first substrate 15 facing the second substrate 16. The liquid crystal layer 13 is disposed between the first substrate 15 and the second substrate 16. The frame glue 14 is disposed between the first substrate 15 and the second substrate 16, and the frame glue 14 is disposed around the liquid crystal layer 13. The liquid crystal antenna further includes a third substrate 17, a fourth substrate 18 and a radiation electrode 19. The third substrate 17 is disposed on a side of the first substrate 15 facing away from the second substrate 16. The fourth substrate 18 is disposed on a side of the second substrate 16 facing away from the third substrate 17. The radiation electrode 19 is disposed on a side of the third substrate 17 facing away from the fourth substrate 18. The third substrate 17 extends beyond an edge of the first substrate 15. The fourth substrate 18 extends beyond edges of the second substrate 16 on at least two sides. A connection structure 20 is disposed between the third substrate 17 and the fourth substrate 18, and the connection structure 20 is disposed on an outer side of the frame glue 14.

Exemplarily, as shown in FIGS. 1 and 2, the liquid crystal cell 10 is filled with a liquid crystal layer 13. The microstrip line 11 is disposed on a side of the liquid crystal layer 13 facing the second substrate 16. The ground metal layer 12 is disposed on a side of the liquid crystal layer 13 facing the first substrate 15. In this embodiment, driving voltage signals are applied to the microstrip line 11 and the ground metal layer 12 separately so as to form an electric field between the microstrip line 11 and the ground metal layer 12. The electric field may drive liquid crystal molecules 131 in the liquid crystal layer 13 to deflect, thereby changing a dielectric constant of the liquid crystal layer 13. The microstrip line 11 is further configured to transmit a radio frequency signal. The radio frequency signal is transmitted in the liquid crystal layer 13 between the microstrip line 11 and the ground metal layer 12. Due to the change of the dielectric constant of the liquid crystal layer 13, a phase of the radio frequency signal transmitted on the microstrip line 11 is shifted, thereby changing the phase of the radio frequency signal to implement a phase shift function of the radio frequency signal. The driving voltage signals on the microstrip line 11 and the ground metal layer 12 are controlled so that a deflection angle of a liquid crystal molecule 131 may be controlled. Thus, a phase adjusted in a phase shift process of the radio frequency signal may be controlled, and finally a beam-pointing direction of the radio frequency signal transmitted by the liquid crystal antenna is controlled.

It is to be noted that the liquid crystal antenna may include one or more microstrip lines 11. For example, as shown in FIG. 1, the liquid crystal antenna includes four microstrip lines 11 distributed in an array. In other embodiments, those skilled in the art may set the number, shape, and layout of the microstrip lines 11 according to actual requirements, which is not limited in the embodiments of the present disclosure.

With continued reference to FIGS. 1 and 2, the frame glue 14 is disposed between the first substrate 15 and the second substrate 16, and the frame glue 14 is disposed around the liquid crystal layer 13 to support the first substrate 15 and the second substrate 16 so as to provide an accommodation space for the liquid crystal layer 13.

With continued reference to FIGS. 1 and 2, the liquid crystal antenna further includes the third substrate 17, the fourth substrate 18, and the radiation electrode 19. The third substrate 17 is disposed on the side of the first substrate 15 facing away from the second substrate 16. The fourth substrate 18 is disposed on the side of the second substrate 16 facing away from the third substrate 17. The radiation electrode 19 is disposed on the side of the third substrate 17 facing away from the fourth substrate 18. In this manner, during the preparation of the liquid crystal antenna, the radiation electrode 19 may be formed on the third substrate 17, the ground metal layer 12 may be formed on the first substrate 15, and then the third substrate 17 and the first substrate 15 are combined. The preparation of the radiation electrode 19 and the ground metal layer 12 can be implemented without a double-sided patterning process, resulting in a simple process, a small loss of consumable materials, a low cost, a high yield, and easy mass production.

With continued reference to FIGS. 1 and 2, exemplarily, a vertical projection of the ground metal layer 12 on the third substrate 17 at least partially overlaps a vertical projection of the radiation electrode 19 on the third substrate 17. The ground metal layer 12 is provided with a first hollow portion 121. A vertical projection of the radiation electrode 19 on a plane where the ground metal layer 12 is located covers the first hollow portion 121. A vertical projection of the microstrip line 11 on the plane where the ground metal layer 12 is located at least partially overlaps the first hollow portion 121. The radio frequency signal is transmitted between the microstrip line 11 and the ground metal layer 12. The liquid crystal layer 13 between the microstrip line 11 and the ground metal layer 12 performs a phase shift on the radio frequency signal so as to change the phase of the radio frequency signal. The phase-shifted radio frequency signal is coupled to the radiation electrode 19 at the first hollow portion 121 of the ground metal layer 12 so as to realize that the radiation electrode 19 radiates a signal outwardly.

It is to be noted that radiation electrodes 19 are disposed corresponding to the microstrip lines 11. For example, the radiation electrodes 19 are in one-to-one correspondence with the microstrip lines 11, and the radiation electrodes 19 corresponding to different microstrip lines 11 are insulated from each other. Optionally, different driving voltage signals are applied to different microstrip lines 11, so that liquid crystal molecules at positions corresponding to the different microstrip lines 11 are deflected differently. Thus, dielectric constants of the liquid crystal layer 13 at respective positions are different, thereby enabling adjustment of phases of radio frequency signals at positions of the different microstrip lines 11 and finally realizing that the radio frequency signals have different beam-pointing directions.

Further, with continued reference to FIGS. 1 and 2, along a direction parallel to the plane where the first substrate 15 is located, the third substrate 17 extends beyond the edge of the first substrate 15, and the fourth substrate 18 extends beyond the edges of the second substrate 16 on the at least two sides. Thus, a fixing space is provided for the connection structure 20 on the outer side of the frame glue 14 so as to dispose the connection structure 20 between the third substrate 17 and the fourth substrate 18.

As shown in FIG. 1, the connection structure 20 may be disposed around the frame glue 14. On the one hand, the liquid crystal cell 10, the third substrate 17, and the fourth substrate 18 are adhered together from a side surface of the liquid crystal cell 10, thereby assembling the liquid crystal cell 10, the third substrate 17, and the fourth substrate 18. On the other hand, the overall encapsulation of the liquid crystal antenna can be implemented so that a microstrip line array structure in the liquid crystal cell 10 can be effectively protected, thereby resisting an influence of a bad external environment, ensuring phase shift performance of the liquid crystal antenna, and improving reliability of the liquid crystal antenna.

It is to be noted that along the direction parallel to the plane where the first substrate 15 is located, the fourth substrate 18 may extend beyond edges of the second substrate 16 on two sides or may extend beyond the second substrate 16 on three, four, or more sides. Those skilled in the art may set a relative positional relationship between the fourth substrate 18 and the second substrate 16 according to a shape of the liquid crystal antenna.

Figure 3:
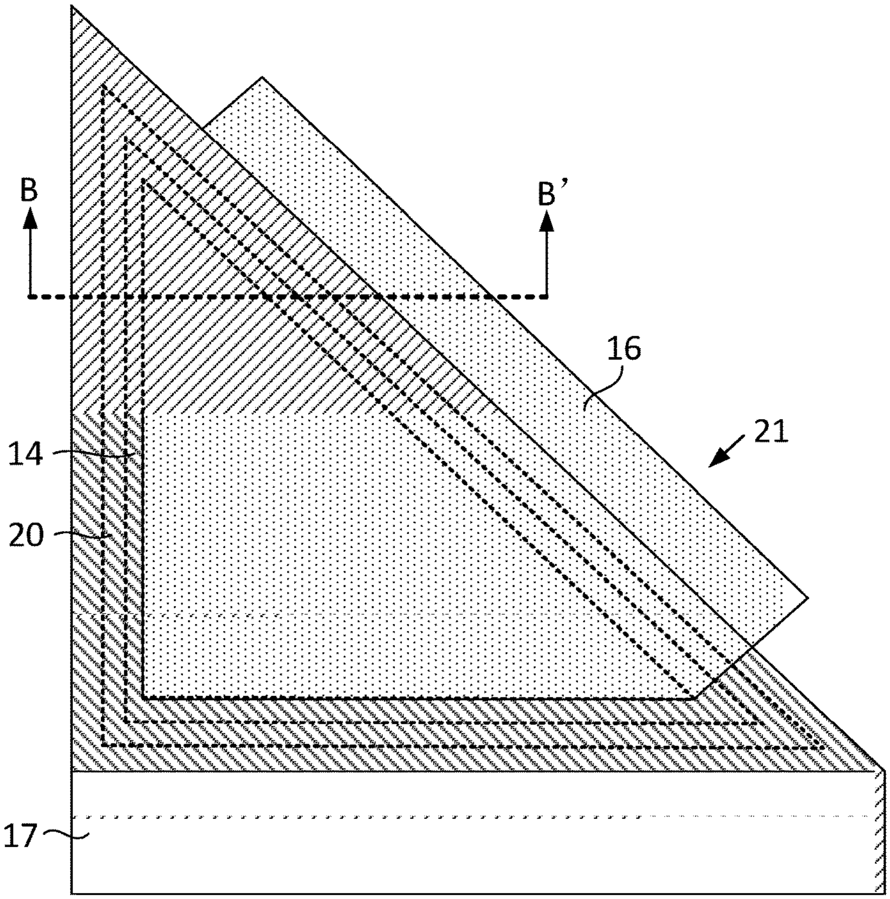
FIG. 3 is a structure view of a third substrate, a fourth substrate, and a liquid crystal cell according to an embodiment of the present disclosure.
Figure 4:
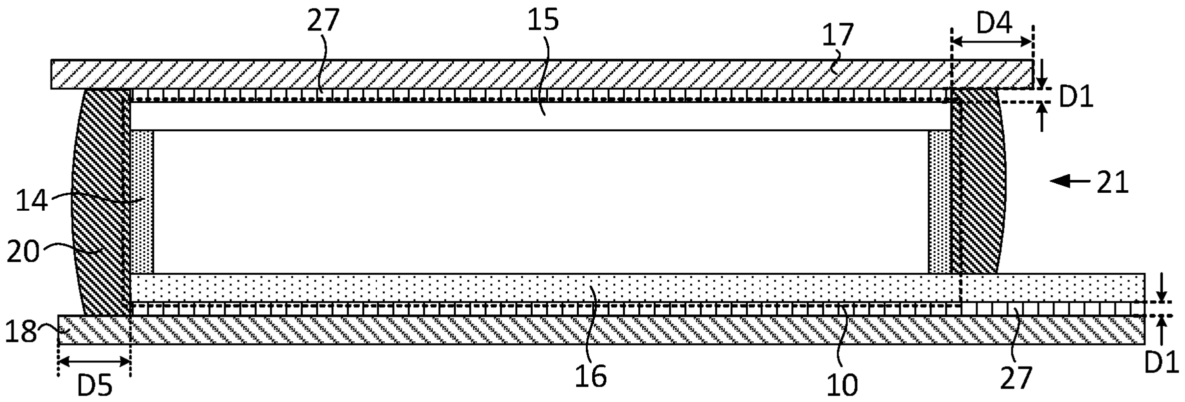
FIG. 4 is a sectional view of FIG. 3 taken along a B-B' direction.

FIG. 3 is a structure view of a third substrate, a fourth substrate, and a liquid crystal cell according to an embodiment of the present disclosure. FIG. 4 is a sectional view of FIG. 3 taken along a B-B' direction. As shown in FIGS. 3 and 4, exemplarily, the liquid crystal cell 10 is triangular and along the direction parallel to the plane where the first substrate 15 is located, the fourth substrate 18 extends beyond the edges of the second substrate 16 on two sides.

Figure 5:
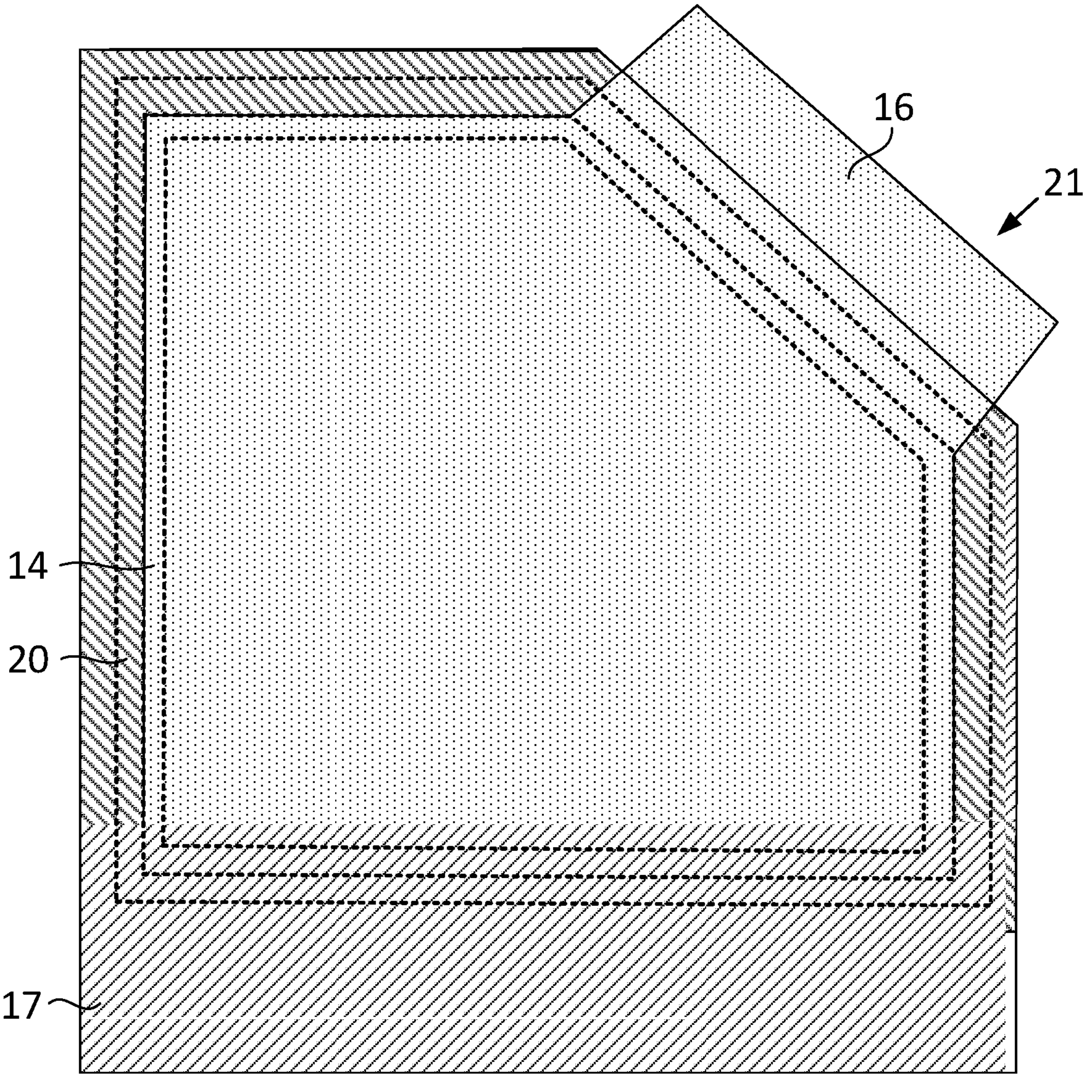
FIG. 5 is a structure view of another third substrate, fourth substrate, and liquid crystal cell according to an embodiment of the present disclosure.

FIG. 5 is a structure view of another third substrate, fourth substrate, and liquid crystal cell according to an embodiment of the present disclosure. As shown in FIG. 5, exemplarily, the liquid crystal cell 10 is pentagonal and along the direction parallel to the plane where the first substrate 15 is located, the fourth substrate 18 extends beyond the edges of the second substrate 16 on four sides.

Figure 6:
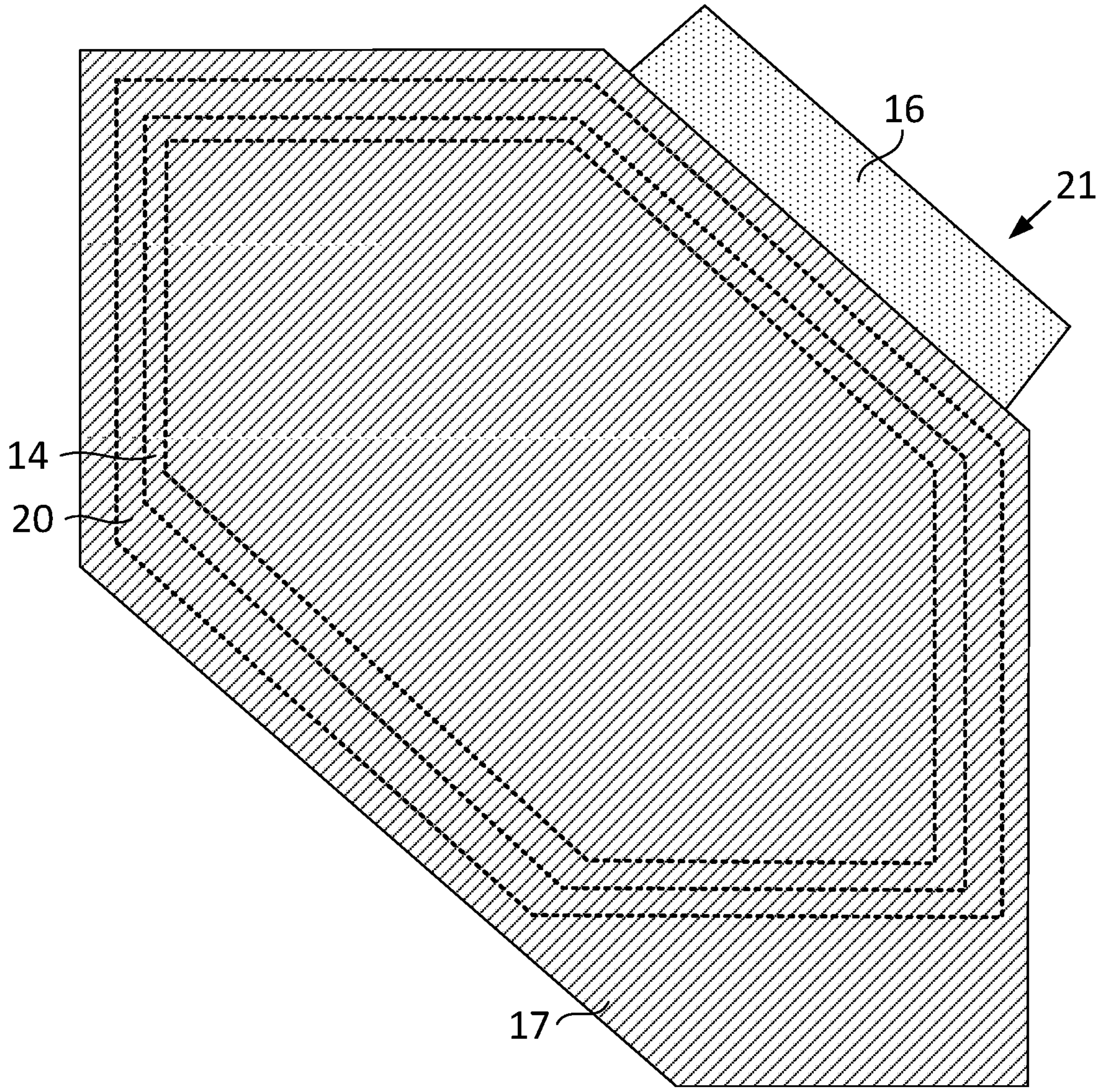
FIG. 6 is a structure view of another third substrate, fourth substrate, and liquid crystal cell according to an embodiment of the present disclosure.

FIG. 6 is a structure view of another third substrate, fourth substrate, and liquid crystal cell according to an embodiment of the present disclosure. As shown in FIG. 6, exemplarily, the liquid crystal cell 10 is hexagonal and along the direction parallel to the plane where the first substrate 15 is located, the fourth substrate 18 extends beyond the edges of the second substrate 16 on five sides.

It is to be noted that for clearly showing relative positional relationships among the third substrate 17, the fourth substrate 18, and the liquid crystal cell 10, merely part of structures of the liquid crystal antenna is shown in FIGS. 3 to 6. In fact, the liquid crystal antenna may further include other functional structures. The preceding drawings are not to limit this embodiment.

With continued reference to FIGS. 1 and 2, exemplarily, the liquid crystal cell 10 is quadrilateral and along the direction parallel to the plane where the first substrate 15 is located, the fourth substrate 18 extends beyond the edges of the second substrate 16 on three sides.

In other embodiments, exemplarily, when the liquid crystal cell 10 is pentagonal and along the direction parallel to the plane where the first substrate 15 is located, the fourth substrate 18 may also be configured to extend beyond the edges of the second substrate 16 on four sides, and so on, and the details are not repeated here.

In summary, according to the liquid crystal antenna provided by the embodiments of the present disclosure, the third substrate 17 and the radiation electrode 19 and the fourth substrate 18 are respectively disposed on two sides of the liquid crystal cell 10, and the radiation electrode 19 is disposed on the side of the third substrate 17 facing away from the fourth substrate 18 so that the radiation electrode 19 is formed on the third substrate 17 and the ground metal layer 12 is formed on the first substrate 15. Thus, the preparation of the radiation electrode 19 and the ground metal layer 12 can be implemented without a double-sided patterning process, preparation difficulty is reduced, and problems of a complicated preparation process, a great loss of consumable materials, a high cost, a low yield, and difficult mass production of the existing liquid crystal antenna are solved. In addition, the third substrate 17 is configured to extend beyond the edge of the first substrate 15 and the fourth substrate 18 is configured to extend beyond the edges of the second substrate 16 on at least two sides, thereby providing an adhesive space on the outer side of the frame glue 14 so as to dispose the connection structure 20 between the third substrate 17 and the fourth substrate 18. In this manner, on the one hand, the liquid crystal cell 10, the third substrate 17, and the fourth substrate 18 are adhered together from the side surface of the liquid crystal cell 10 so as to assemble the liquid crystal cell 10, the third substrate 17, and the fourth substrate 18, and on the other hand, the overall encapsulation of the liquid crystal antenna is implemented and the microstrip line array structure in the liquid crystal cell 10 is effectively protected, thereby resisting the influence of the bad external environment, ensuring the phase shift performance of the liquid crystal antenna, and improving the reliability of the liquid crystal antenna.

With continued reference to FIGS. 1 to 4, optionally, one side of the liquid crystal cell 10 is a bonding side 21. On the bonding side 21, the second substrate 16 extends beyond the edge of the first substrate 15, and on sides of the liquid crystal cell 10 other than the bonding side 21, the connection structure 20 is in contact with the third substrate 17 and the fourth substrate 18 separately.

As shown in FIGS. 1 and 2, the liquid crystal cell 10 includes the bonding side 21, and on the bonding side 21, the second substrate 16 extends beyond the edge of the first substrate 15. A bonding terminal 22 may be disposed on a surface of a portion of the second substrate 16 protruding from the first substrate 15. The bonding terminal 22 is correspondingly and electrically connected to the microstrip line 11, and the bonding terminal 22 may be configured to connect the microstrip line 11 to an external circuit so that the microstrip line 11 receives a driving voltage signal provided by the external circuit, thereby driving the liquid crystal molecules 131 in the liquid crystal layer 13 to deflect. The bonding terminal 22 may be correspondingly connected to the microstrip line 11 through a driving voltage signal transmission line 24, and the arrangement of the driving voltage signal transmission line 24 may be set according to the actual requirements.

Exemplarily, the bonding terminal 22 may be bonded to a flexible printed circuit (FPC) 23 on which the external circuit is disposed so that the microstrip line 11 receives the driving voltage signal provided by the external circuit through the FPC 23.

In another embodiment, the bonding terminal 22 may also be directly connected to the external circuit so that the microstrip line 11 receives the driving voltage signal provided by the external circuit.

In another embodiment, the external circuit may also be disposed on another mainboard. The bonding terminal 22 is bonded to the FPC 23 and the FPC 23 is then bonded to the external circuit, thereby realizing that the microstrip line 11 receives the driving voltage signal provided by the external circuit.

In another optional embodiment, a chip may be disposed on the second substrate 16 for processing electrical signals. The chip is connected to the bonding terminal 22 through a circuit disposed on the second substrate 16. The bonding terminal 22 is connected to the FPC 23 to process the electrical signals through the cooperation between the FPC 23 and the chip, and device integration is improved.

With continued reference to FIGS. 1 to 4, the fourth substrate 18 may be flush with the edge of the second substrate 16 on the bonding side 21 of the liquid crystal cell 10 along the direction parallel to the plane where the first substrate 15 is located, which is not limited thereto. The connection structure 20 is in contact with the third substrate 17 and the second substrate 16 separately. On the sides of the liquid crystal cell 10 other than the bonding side 21, the fourth substrate 18 may be configured to extend beyond the edges of the second substrate 16 along the direction parallel to the plane where the first substrate 15 is located. Thus, on the sides of the liquid crystal cell 10 other than the bonding side 21, the connection structure 20 may be configured to be in contact with the third substrate 17 and the fourth substrate 18 separately. On the sides of the liquid crystal cell 10 other than the bonding side 21, the connection structure 20 is configured to be in contact with the third substrate 17 and the fourth substrate 18 separately so that areas of the connection structure 20 separately contacting with the third substrate 17 and the fourth substrate 18 can be increased. Thus, an adhesion force is greater, thereby improving encapsulation firmness of the liquid crystal antenna.

With continued reference to FIGS. 2 and 4, optionally, the connection structure 20 is in contact with sidewalls of the liquid crystal cell 10.

As shown in FIGS. 2 and 4, the connection structure 20 is configured to be in contact with the sidewalls of the liquid crystal cell 10 so that a fixing force to the liquid crystal cell 10 may be increased and the liquid crystal cell 10 does not move relative to the third substrate 17 and the fourth substrate 18, thereby improving stability of the liquid crystal antenna.

With continued reference to FIGS. 2 and 4, optionally, the sidewalls of the liquid crystal cell 10 include a sidewall of the first substrate 15, a sidewall of the second substrate 16, and a sidewall of the frame glue 14 facing away from the liquid crystal layer 13. The connection structure 20 is in contact with at least the sidewall of the first substrate 15 and the sidewall of the second substrate 16.

The connection structure 20 is configured to be in contact with the sidewall of the first substrate 15 so that a fixing force to the first substrate 15 can be increased and the first substrate 15 does not move relative to the third substrate 17, thereby improving the stability of the liquid crystal antenna.

It is to be noted that the connection structure 20 may be in contact with merely part of the sidewalls of the first substrate 15. The connection structure 20 may also be in contact with each sidewall of the first substrate 15. It is to be understood that the larger the contact area between the connection structure 20 and the sidewalls of the first substrate 15 is, the greater the fixing force to the first substrate 15 is and more strongly the first substrate 15 is fixed between the third substrate 17 and the fourth substrate 18.

Similarly, the connection structure 20 is configured to be in contact with sidewalls of the second substrate 16 so that a fixing force to the second substrate 16 can be increased and the second substrate 16 does not move relative to the fourth substrate 18, thereby improving the stability of the liquid crystal antenna.

It is to be noted that the connection structure 20 may be in contact with merely part of sidewalls of the second substrate 16. The connection structure 20 may also be in contact with each sidewall of the second substrate 16. It is to be understood that the larger the contact area between the connection structure 20 and the sidewalls of the second substrate 16 is, the greater the fixing force for the second substrate 16 is and more strongly the second substrate 16 is fixed between the third substrate 17 and the fourth substrate 18.

Exemplarily, as shown in FIGS. 2 and 4, the connection structure 20 is in contact with each sidewall of the first substrate 15, and the connection structure 20 is in contact with the sidewalls of the second substrate 16 on the sides of the liquid crystal cell 10 other than the bonding side 21, which is not limited thereto.

It is to be noted that when the liquid crystal antenna is prepared, the third substrate 17 and the fourth substrate 18 are respectively placed at corresponding positions of the liquid crystal cell 10, and then the connection structure 20 is formed on the sidewalls of the liquid crystal cell 10 so that the connection structure 20 is in contact with the sidewalls of the first substrate 15 and the second substrate 16. For example, the sidewalls of the liquid crystal cell 10 are directly coated with adhesive layers to manufacture the connection structure 20. In this case, the sidewalls of the liquid crystal cell 10 may have a positioning function.

Multiple coatings are directly applied along the sidewalls of the liquid crystal cell 10 to form the connection structure 20, which is less difficult to manufacture and does not reduce an overall yield.

Further, the connection structure 20 may also be in contact with the sidewall of the frame glue 14 facing away from the liquid crystal layer 13 so that the fixing force to the liquid crystal cell 10 may be further increased. Thus, the liquid crystal cell 10 does not shake between the third substrate 17 and the fourth substrate 18, thereby improving the stability of the liquid crystal antenna.

It is to be noted that the connection structure 20 may be in contact with merely part of the sidewalls of the frame glue 14 facing away from the liquid crystal layer 13. The connection structure 20 may be in contact with each sidewall of the frame glue 14 facing away from the liquid crystal layer 13. It is to be understood that the larger the contact area between the connection structure 20 and the sidewall of the frame glue 14 facing away from the liquid crystal layer 13 is, the greater the fixing force to the liquid crystal cell 10 is and more strongly the liquid crystal cell 10 is fixed between the third substrate 17 and the fourth substrate 18.

It is to be understood that if the connection structure 20 is manufactured by directly coating the sidewalls of the liquid crystal cell 10 with adhesive layers, whether the connection structure 20 is in contact with the sidewall of the frame glue 14 facing away from the liquid crystal layer 13 depends on relative positional relationships between the frame glue 14 and the first substrate 15 and the second substrate 16. When the frame glue 14 is closer to the edges of the first substrate 15 and the second substrate 16, it is easier for the connection structure 20 to be in contact with the sidewall of the frame glue 14 facing away from the liquid crystal layer 13.

With continued reference to FIGS. 1 to 4, optionally, the connection structure 20 includes an encapsulant.

Exemplarily, as shown in FIGS. 1 to 4, the connection structure 20 may be made of the encapsulant. The encapsulant is coated to fix the third substrate 17, the fourth substrate 18, and the liquid crystal cell 10 so that the third substrate 17, the fourth substrate 18, and the liquid crystal cell 10 are adhered together with a high adhesion degree. In addition, the connection structure 20 may be manufactured by a mature process such as coating, which is less difficult to manufacture and does not reduce the overall yield.

A range of the encapsulant may be configured according to the actual requirements. For example, as shown in FIGS. 1 to 4, the encapsulant surrounds the frame glue 14 in a circle, thereby ensuring adhesion firmness and a sealing degree of the encapsulation, which is not limited thereto.

In addition, the encapsulant may be made of a resin material or other adhesive materials, which is not limited in the embodiments of the present disclosure.

With continued reference to FIGS. 1 to 4, optionally, a vertical projection of the encapsulant on a plane where the fourth substrate 18 is located is within the fourth substrate 18.

As shown in FIGS. 1 to 4, the vertical projection of the encapsulant on the plane where the fourth substrate 18 is located is configured to be within the fourth substrate 18 so that the encapsulant does not extend beyond an edge of the fourth substrate 18 along a direction parallel to the first substrate 15, thereby preventing the encapsulant from being exposed and affecting beauty of the liquid crystal antenna. In addition, materials may be saved and a manufacturing cost of the liquid crystal antenna may be reduced. In addition, it helps to reduce an influence of the encapsulant on a dimension of the liquid crystal antenna and facilitates the miniaturization design of the liquid crystal antenna.

In addition, when the liquid crystal antenna is manufactured, a large-substrate manufacturing process may be adopted, in which multiple liquid crystal antenna structures are formed on one large substrate and then separated from each other by cutting. In this case, if the encapsulant extends beyond the edge of the fourth substrate 18, the cutting may be affected by the encapsulant, resulting in affecting a cutting effect. Therefore, in this embodiment, the encapsulant is configured not to extend beyond the edge of the fourth substrate 18 so as to facilitate the cutting.

It is to be noted that in the large-substrate manufacturing process, a large third substrate 17 and a large fourth substrate 18 are respectively placed at corresponding positions of the liquid crystal cell 10, and then the encapsulant is coated onto the side surface of the liquid crystal cell 10. In this case, the bonding side 21 of the liquid crystal cell 10 may remain uncoated with the encapsulant. After the liquid crystal antennas are separated from each other by cutting, bonding is performed on the bonding side 21 of the liquid crystal cell 10. After the bonding process is completed, glue is dispensed to the bonding side 21 of the liquid crystal cell 10 so as to implement the encapsulation of the bonding side 21 of the liquid crystal cell 10. In this manner, it is conducive to increasing efficiency of the preparation method and improving the overall yield.

Figure 7:
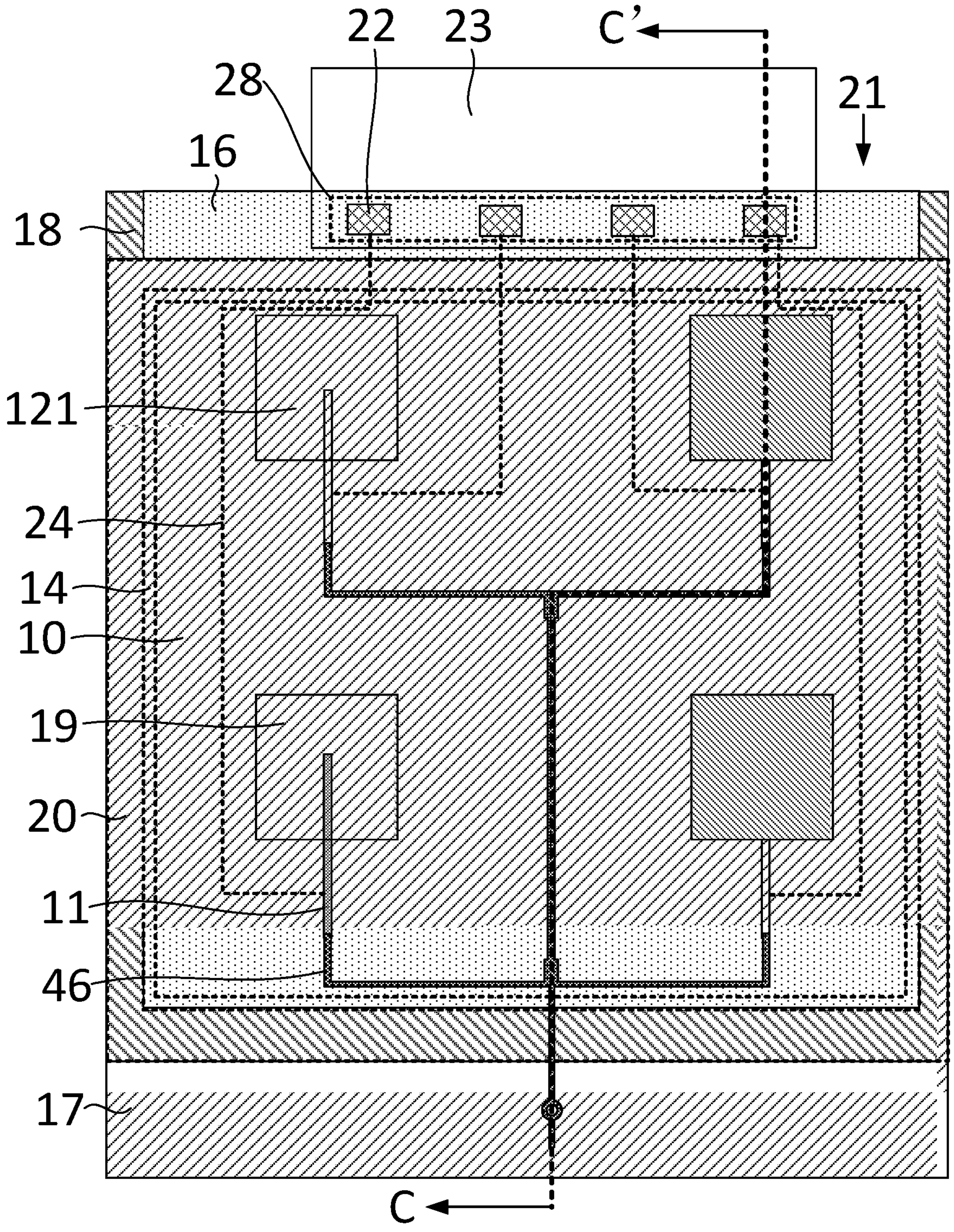
FIG. 7 is a structure view of another liquid crystal antenna according to an embodiment of the present disclosure.
Figure 8:
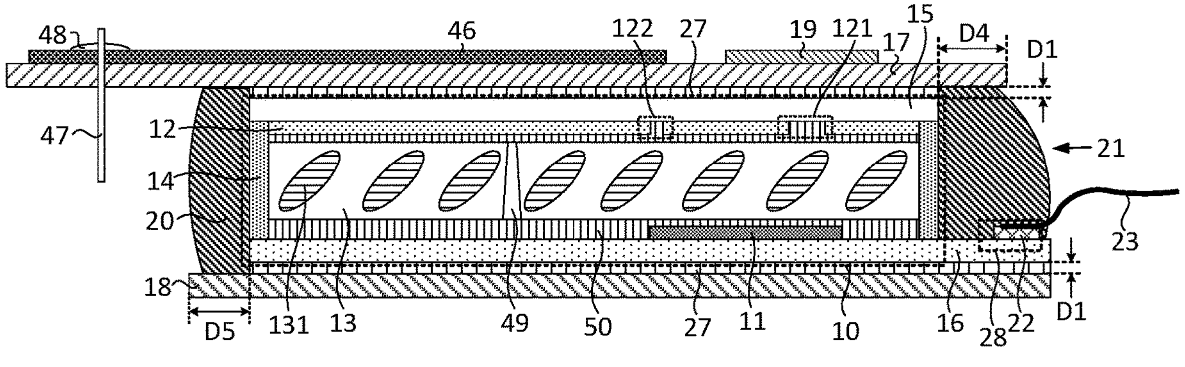
FIG. 8 is a sectional view of FIG. 7 taken along a C-C' direction.

Exemplarily, FIG. 7 is a structure view of another liquid crystal antenna according to an embodiment of the present disclosure. FIG. 8 is a sectional view of FIG. 7 taken along a C-C' direction. As shown in FIGS. 7 and 8, the encapsulant may be configured to be flush with the edge of the fourth substrate 18 along the direction parallel to the first substrate 15 so that areas of the encapsulant separately contacting with the third substrate 17 and the fourth substrate 18 can be maximized without affecting the dimension of the liquid crystal antenna. Thus, the adhesion firmness is improved, thereby improving reliability of an overall liquid crystal antenna.

Figure 9:
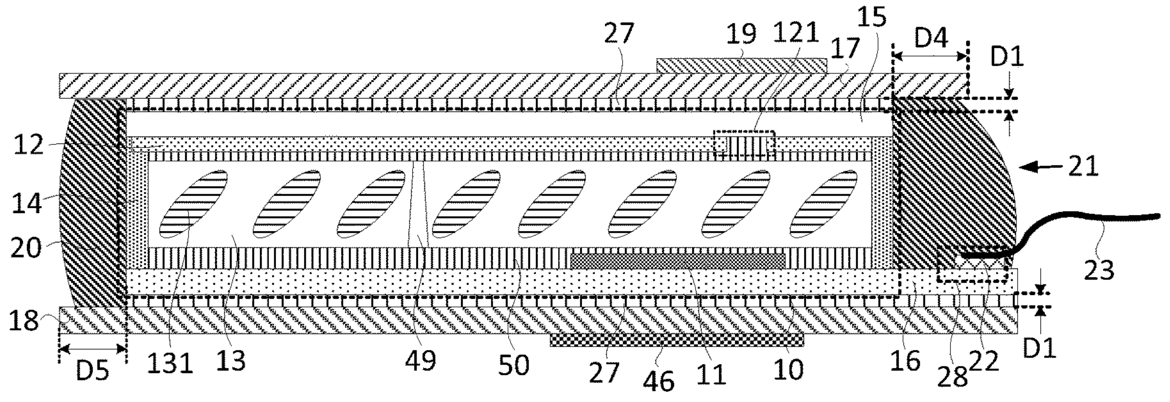
FIG. 9 is a sectional view showing part of a liquid crystal antenna according to an embodiment of the present disclosure.
Figure 10:
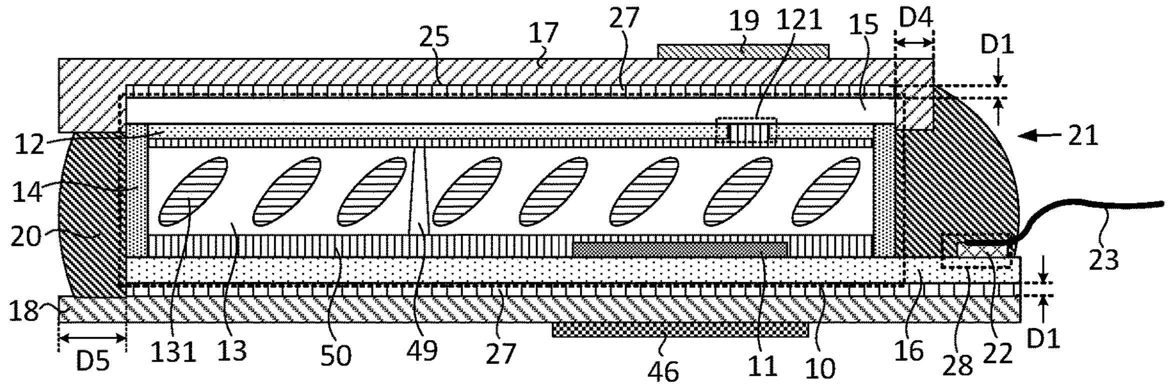
FIG. 10 is a sectional view showing part of another liquid crystal antenna according to an embodiment of the present disclosure.
Figure 11:
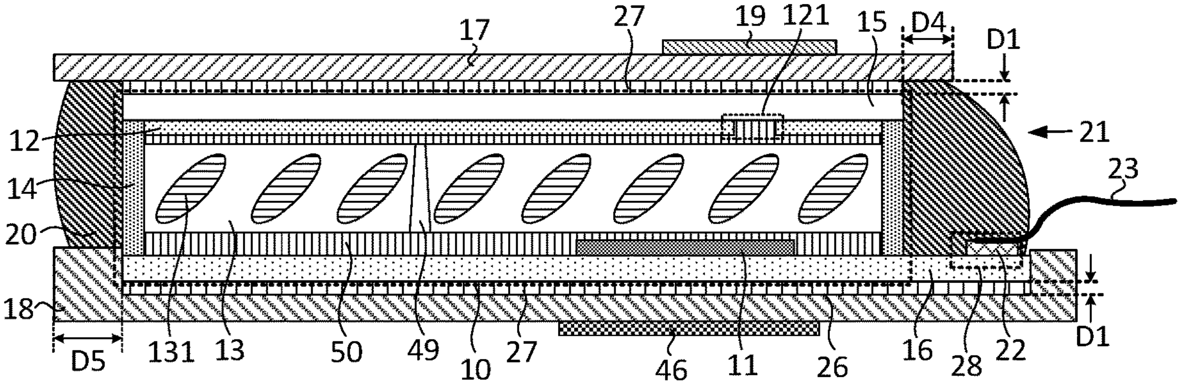
FIG. 11 is a sectional view showing part of another liquid crystal antenna according to an embodiment of the present disclosure.
Figure 12:
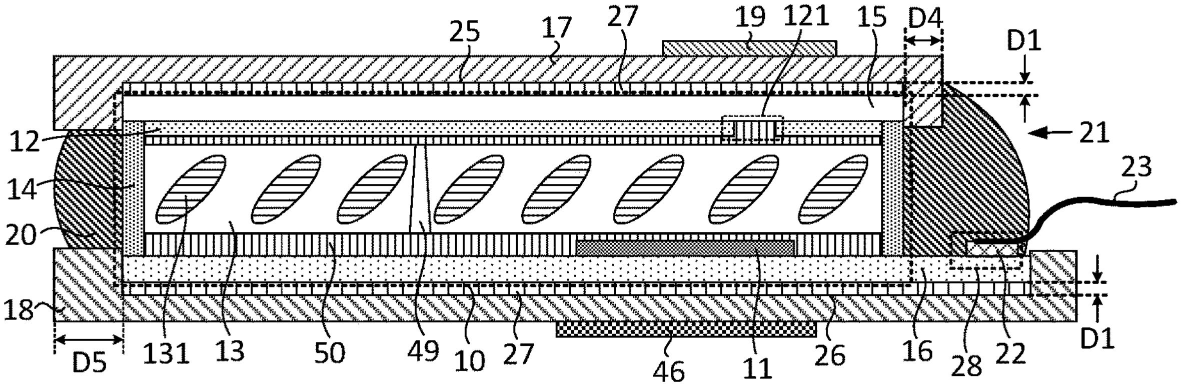
FIG. 12 is a sectional view showing part of another liquid crystal antenna according to an embodiment of the present disclosure.

FIG. 9 is a sectional view showing part of a liquid crystal antenna according to an embodiment of the present disclosure. As shown in FIG. 9, optionally, the liquid crystal antenna provided by the embodiments of the present disclosure further includes a feed structure 46 coupled to the microstrip line 11. The feed structure 46 is disposed on a side of the fourth substrate 18 facing away from the third substrate 17. A vertical projection of the feed structure 46 on the fourth substrate 18 covers a vertical projection of the microstrip line 11 on the fourth substrate 18 so as to transmit the radio frequency signal to the microstrip line 11, thereby playing a role of starting vibration. FIG. 10 is a sectional view showing part of a liquid crystal antenna according to an embodiment of the present disclosure. FIG. 11 is a sectional view showing part of another liquid crystal antenna according to an embodiment of the present disclosure. FIG. 12 is a sectional view showing part of another liquid crystal antenna according to an embodiment of the present disclosure. As shown in FIGS. 10 to 12, optionally, the third substrate 17 includes a first groove 25 and the first substrate 15 is accommodated in the first groove 25; and/or the fourth substrate 18 includes a second groove 26 and the second substrate 16 is accommodated in the second groove 26.

Exemplarily, as shown in FIG. 10, the first groove 25 is disposed on the third substrate 17, and the first substrate 15 is accommodated in the first groove 25. The first groove 25 can function as an engaging position so that a position of the liquid crystal cell 10 can be more accurate. In addition, the first substrate 15 can be prevented from moving relative to the third substrate 17 along the direction parallel to the first substrate 15, thereby helping improve firmness of a connection between the third substrate 17 and the first substrate 15 and thus improving the reliability of the overall liquid crystal antenna.

For example, as shown in FIG. 11, the second groove 26 is disposed on the fourth substrate 18, and the second substrate 16 is accommodated in the second groove 26. The second groove 26 can function as the engaging position so that the position of the liquid crystal cell 10 can be more accurate. In addition, the second substrate 16 can also be prevented from moving relative to the fourth substrate 18 along the direction parallel to the first substrate 15, thereby helping improve firmness of a connection between the fourth substrate 18 and the second substrate 16 and thus improving the reliability of the overall liquid crystal antenna.

Further, as shown in FIG. 12, it is also feasible that the third substrate 17 is configured to include the first groove 25 and the first substrate 15 is accommodated in the first groove 25; and the fourth substrate 18 is configured to include the second groove 26 and the second substrate 16 is accommodated in the second groove 26, so as to further improve the accuracy of the position of the liquid crystal cell 10 and the encapsulation firmness among the third substrate 17, the fourth substrate 18, and the liquid crystal cell 10, thereby further improving the reliability of the overall liquid crystal antenna.

With continued reference to FIGS. 2, 4, and 8 to 12, optionally, the third substrate 17 and the first substrate 15 are connected to each other through a first adhesive layer 27; and/or the second substrate 16 and the fourth substrate 18 are connected to each other through a first adhesive layer 27.

Exemplarily, as shown in FIGS. 2, 4, and 8 to 12, first adhesive layers 27 are disposed between the third substrate 17 and the first substrate 15 and between the second substrate 16 and the fourth substrate 18 so that the third substrate 17 is adhered to the first substrate 15 and the second substrate 16 is adhered to the fourth substrate 18 by laminating whole surfaces. Thus, the firmness of the connection between the third substrate 17 and the first substrate 15 and the firmness of the connection between the second substrate 16 and the fourth substrate 18 can be improved.

It is to be noted that FIGS. 2, 4, 8 to 12 merely illustrate an example in which the first adhesive layers 27 are disposed between the third substrate 17 and the first substrate 15 and between the second substrate 16 and the fourth substrate 18, which is not limited thereto. In other embodiments, the first adhesive layer 27 may be disposed merely between the third substrate 17 and the first substrate 15, or the first adhesive layer 27 may be disposed merely between the second substrate 16 and the fourth substrate 18. Those skilled in the art may dispose the first adhesive layer 27 according to the actual requirements.

In addition, the first adhesive layer 27 may be an optical adhesive or another adhesive material, which is not limited in the embodiments of the present disclosure.

With continued reference to FIGS. 2, 4, and 8 to 12, optionally, the thickness of the first adhesive layer is D1, where 0.5 mm≤D1≤1 mm.

As shown in FIGS. 2, 4, and 8 to 12, since the connection structure 20 on the side surface of the liquid crystal cell 10 plays a role of bonding and encapsulate the liquid crystal cell 10, the third substrate 17, and the fourth substrate 18, a relatively thin first adhesive layer 27 can ensure the firmness of the connection among the liquid crystal cell 10, the third substrate 17, and the fourth substrate 18.

In this embodiment, the thickness D1 of the first adhesive layer 27 is configured to satisfy 0.5 mm≤D1≤1 mm so that an influence of the first adhesive layer 27 on the radio frequency signal can be reduced while the encapsulation firmness of the liquid crystal antenna is ensured, thereby reducing an additional loss of the radio frequency signal and helping improve the performance of the liquid crystal antenna.

Figure 13:
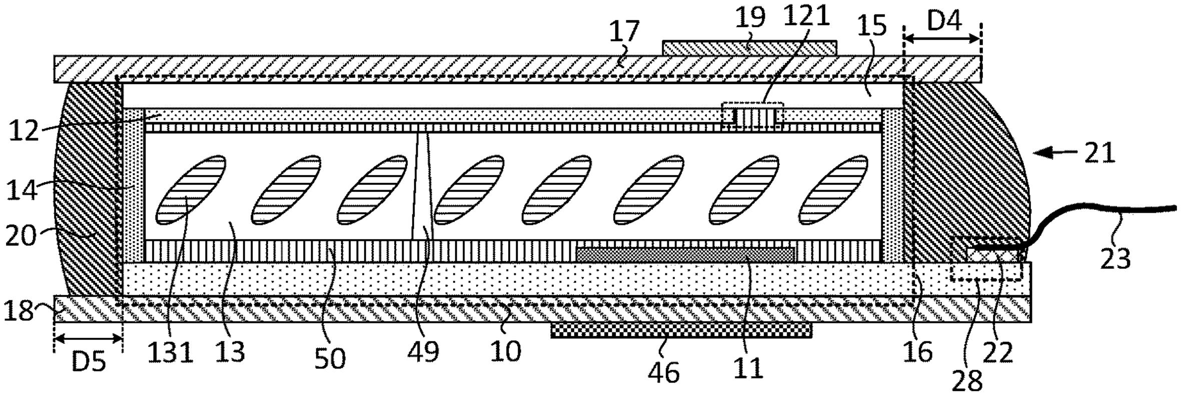
FIG. 13 is a sectional view showing part of another liquid crystal antenna according to an embodiment of the present disclosure.

FIG. 13 is a sectional view showing part of another liquid crystal antenna according to an embodiment of the present disclosure. As shown in FIG. 13, optionally, a surface of a side of the third substrate 17 facing the first substrate 15 is in contact with a surface of a side of the first substrate 15 facing the third substrate 17; and/or a surface of a side of the second substrate 16 facing the fourth substrate 18 is in contact with a surface of a side of the fourth substrate 18 facing the second substrate 16.

Exemplarily, as shown in FIG. 13, since the connection structure 20 on the side surface of the liquid crystal cell 10 plays a role of bonding and encapsulating the liquid crystal cell 10, the third substrate 17, and the fourth substrate 18, the first adhesive layer 27 may be canceled so that the third substrate 17 and the first substrate 15 are in direct contact with each other and the second substrate 16 and the fourth substrate 18 are in surface contact with each other, thereby avoiding the influence of the first adhesive layer 27 on the radio frequency signal, further reducing the additional loss of the radio frequency signal, and helping improve the performance of the liquid crystal antenna.

It is to be noted that FIG. 13 merely illustrates an example in which the third substrate 17 and the first substrate 15 are in direct contact with each other and the second substrate 16 and the fourth substrate 18 are in direct contact with each other, which is not limited thereto. In other embodiments, merely the third substrate 17 and the first substrate 15 may be in direct contact with each other, or merely the second substrate 16 and the fourth substrate 18 may be in direct contact with each other, which can be set by those skilled in the art according to the actual requirements.

With continued reference to FIGS. 1 and 7, optionally, the second substrate 16 includes a bonding connection region 28 disposed on the bonding side 21 of the liquid crystal cell 10. The bonding connection region 28 is electrically connected to the microstrip 11, and the bonding connection region 28 is connected to the external circuit.

Exemplarily, as shown in FIGS. 1 and 7, the second substrate 16 is provided with the bonding connection region 28 in which the bonding terminal 22 is disposed. The bonding terminal 22 may be correspondingly connected to the microstrip line 11 through the driving voltage signal transmission line 24. The FPC 23 is bonded to the bonding terminal 22 in the bonding connection region 28 so that the bonding terminal 22 is connected to the external circuit through the FPC 23. Thus, the microstrip line 11 receives the driving voltage signal provided by the external circuit to drive the liquid crystal molecules 131 in the liquid crystal layer 13 to deflect.

A position and a range where the bonding connection region 28 is disposed may be set according to the actual requirements. Exemplarily, as shown in FIGS. 1 and 7, the bonding connection region 28 may be disposed at the portion of the second substrate 16 protruding from the first substrate 15. Thus, when the bonding connection region 28 is bonded to the FPC 23, the FPC 23 is not limited by a space of the first substrate 15, thereby facilitating the bonding between the bonding connection region 28 and the FPC 23.

Figure 14:
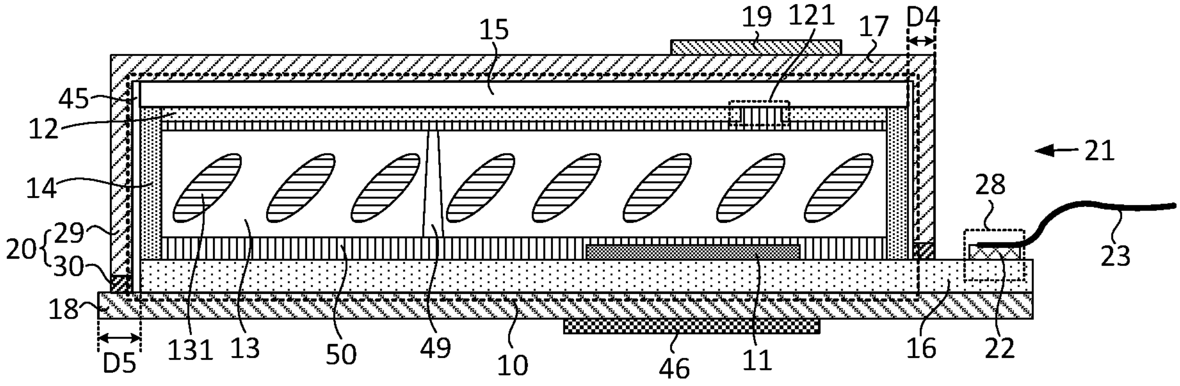
FIG. 14 is a sectional view showing part of another liquid crystal antenna according to an embodiment of the present disclosure.

FIG. 14 is a sectional view showing part of another liquid crystal antenna according to an embodiment of the present disclosure. As shown in FIG. 14, optionally, the connection structure 20 includes a first encapsulation sidewall 29 disposed on the third substrate 17 and a second adhesive layer 30 disposed on a side of the first encapsulation sidewall 29 facing the fourth substrate 18. The first encapsulation sidewall 29 is disposed around the frame glue 14, and the bonding connection region 28 is disposed on a side of the first encapsulation sidewall 29 facing away from the frame glue 14. The first encapsulation sidewall 29 is connected to the second substrate 16 and the fourth substrate 18 separately through the second adhesive layer 30.

Exemplarily, as shown in FIG. 14, the connection structure 20 includes the first encapsulation sidewall 29 disposed around the frame glue 14 and the second adhesive layer 30. The first encapsulation sidewall 29 adheres to the second substrate 16 and the fourth substrate 18 separately through the second adhesive layer 30 so as to fix the third substrate 17, the fourth substrate 18, and the liquid crystal cell 10 together, thereby implementing the overall encapsulation of the liquid crystal antenna.

Further, as shown in FIG. 14, the bonding connection region 28 is disposed on the side of the first encapsulation sidewall 29 facing away from the frame glue 14 so that the bonding between the bonding connection region 28 and the FPC 23 is not affected by the first encapsulation sidewall 29.

It is to be noted that on the bonding side 21 of the liquid crystal cell 10, since the bonding connection region 28 is disposed on the side of the first encapsulation sidewall 29 facing away from the frame glue 14, the first encapsulation sidewall 29 adheres to the second substrate 16 through the second adhesive layer 30. On the sides of the liquid crystal cell 10 other than the bonding side 21, the first encapsulation sidewall 29 adheres to the fourth substrate 18 through the second adhesive layer 30 so that a fixed connection between the third substrate 17 and the fourth substrate 18 is implemented.

With continued reference to FIG. 14, optionally, the first encapsulation sidewall 29 and the third substrate 17 may be an integrated structure so that no glue is needed for the first encapsulation sidewall 29 to adhere to the third substrate 17 so as to connect the first encapsulation sidewall 29 to the third substrate 17 more firmly, which is not limited thereto.

Figure 15:
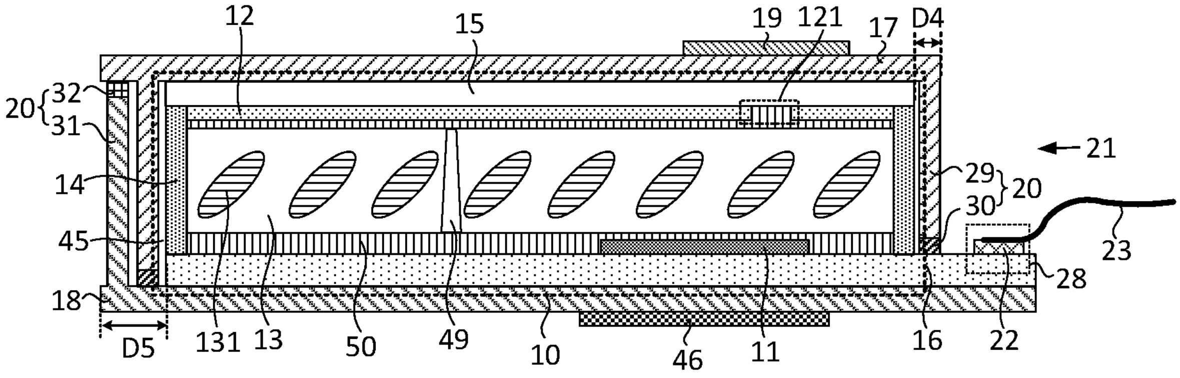
FIG. 15 is a sectional view showing part of another liquid crystal antenna according to an embodiment of the present disclosure.

FIG. 15 is a sectional view showing part of another liquid crystal antenna according to an embodiment of the present disclosure. As shown in FIG. 15, optionally, the connection structure 20 further includes a second encapsulation sidewall 31 disposed on the fourth substrate 18 and a third adhesive layer 32 disposed on a side of the second encapsulation sidewall 31 facing the third substrate 17. The second encapsulation sidewall 31 is disposed on another side of the liquid crystal cell 10 other than the bonding side 21, and the second encapsulation sidewall 31 is disposed on the side of the frame glue 14 facing away from the liquid crystal layer 13. The second encapsulation sidewall 31 is connected to the third substrate 17 through the third adhesive layer 32.

Exemplarily, as shown in FIG. 15, the connection structure 20 further includes the second encapsulation sidewall 31 and the third adhesive layer 32. The second encapsulation sidewall 31 is disposed on the sides of the liquid crystal cell 10 other than the bonding side 21. The second encapsulation sidewall 31 adheres to the third substrate 17 through the third adhesive layer 32, thereby further improving firmness of a connection between the third substrate 17 and the fourth substrate 18. In addition, the second encapsulation sidewall 31 is added so that encapsulation tightness can be further improved, thereby further reducing an influence of a harsh external environment on the performance of the liquid crystal antenna.

With continued reference to FIG. 15, optionally, the second encapsulation sidewall 31 and the fourth substrate 18 may be an integrated structure so that no glue is needed for the second encapsulation sidewall 31 to adhere to the fourth substrate 18 so as to connect the second encapsulation sidewall 31 to the fourth substrate 18 more firmly, which is not limited thereto.

It is to be noted that in the case where the first encapsulation sidewall 29 and the third substrate 17 are the integrated structure and the second encapsulation sidewall 31 and the fourth substrate 18 are the integrated structure, the third substrate 17 and the fourth substrate 18 may be combined in a manner of sealing and nesting each other. Thus, sealing performance is improved and no first adhesive layers 27 need be disposed between the third substrate 17 and the first substrate 15 and between the second substrate 16 and the fourth substrate 18, thereby avoiding the influence of the first adhesive layer 27 on the radio frequency signal, reducing the additional loss of the radio frequency signal, and improving the performance of the liquid crystal antenna. In addition, the encapsulation structure is an overall structure viewed from the outside, the structure is more reliable, and an overall space occupied is smaller (full encapsulation).

Figure 16:
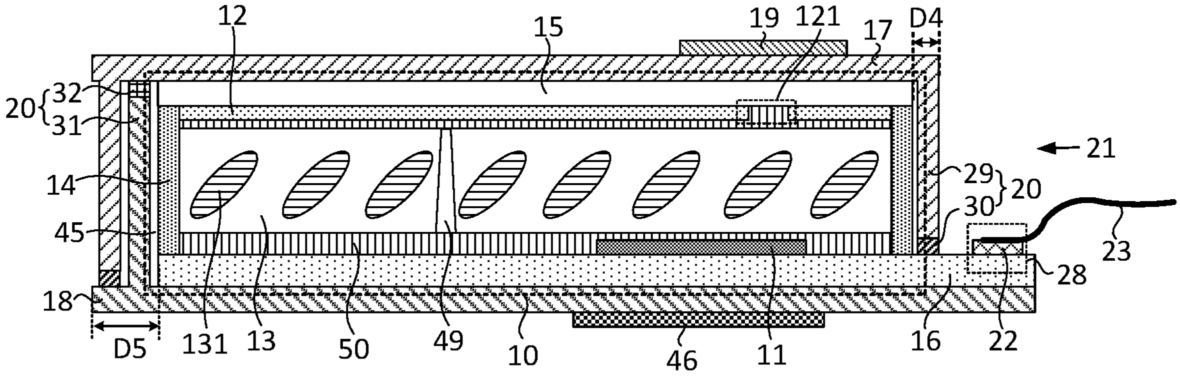
FIG. 16 is a sectional view showing part of another liquid crystal antenna according to an embodiment of the present disclosure.

FIG. 16 is a sectional view showing part of another liquid crystal antenna according to an embodiment of the present disclosure. As shown in FIGS. 15 and 16, optionally, the second encapsulation sidewall 31 is disposed on a side of the first encapsulation sidewall 29 facing the frame glue 14. Alternatively, the second encapsulation sidewall 31 is disposed on the side of the first encapsulation sidewall 29 facing away from the frame glue 14.

Exemplarily, as shown in FIG. 15, the second encapsulation sidewall 31 may be disposed on the side of the first encapsulation sidewall 29 facing away from the frame glue 14 so that the third substrate 17 and the fourth substrate 18 may be combined in the manner of sealing and nesting each other.

In other embodiments, as shown in FIG. 16, the second encapsulation sidewall 31 may also be disposed on the side of the first encapsulation sidewall 29 facing the frame glue 14. Thus, the third substrate 17 and the fourth substrate 18 may be combined in the manner of sealing and nesting each other, and the engaging position may also be formed by the first encapsulation sidewall 29 and the second encapsulation sidewall 31 with the liquid crystal cell 10 so that the position of the liquid crystal cell 10 is more accurate and a nesting structure is more fixed.

Figure 17:
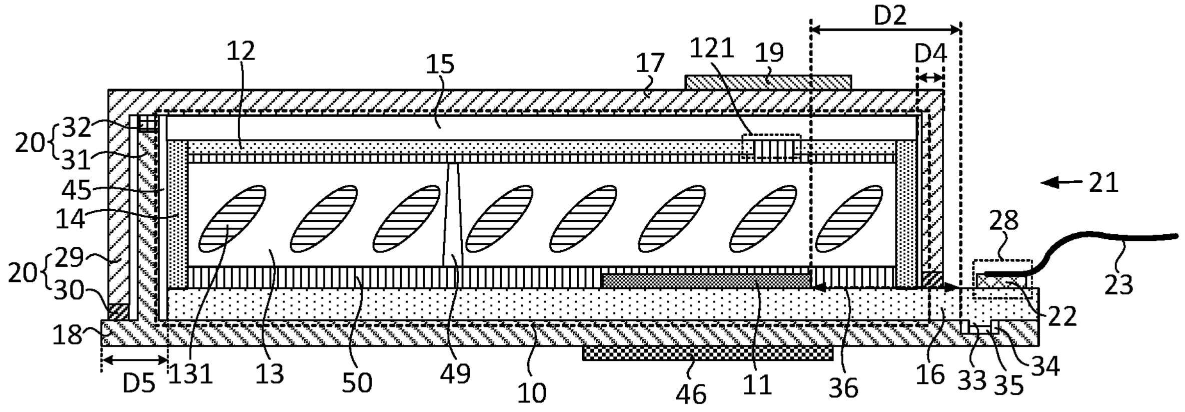
FIG. 17 is a sectional view showing part of another liquid crystal antenna according to an embodiment of the present disclosure.

FIG. 17 is a sectional view showing part of another liquid crystal antenna according to an embodiment of the present disclosure. As shown in FIG. 17, optionally, a first protrusion structure 33 is disposed on a side of the second substrate 16 facing the fourth substrate 18, and a third groove 34 corresponding to the first protrusion structure 33 is disposed on the side of the fourth substrate 18 facing the second substrate 16. A fourth adhesive layer 35 is disposed on a side of the first protrusion structure 33 facing away from the first substrate 15, and the first protrusion structure 33 is connected to a surface of a side of the third groove 34 facing the second substrate 16 through the fourth adhesive layer 35.

Exemplarily, as shown in FIG. 17, the first protrusion structure 33 and the corresponding third groove 34 are disposed on the second substrate 16 and the fourth substrate 18 respectively. The first protrusion structure 33 is accommodated in the third groove 34. The first protrusion structure 33 and the third groove 34 can function as engaging positions so that the position of the liquid crystal cell 10 is more accurate. In addition, the relative movement between the second substrate 16 and the fourth substrate 18 can also be avoided, thereby helping improve the firmness of the connection between the second substrate 16 and the fourth substrate 18.

Further, as shown in FIG. 17, the fourth adhesive layer 35 is further disposed between the first protrusion structure 33 and the third groove 34 so that the first protrusion structure 33 adheres to the third groove 34 through the fourth adhesive layer 35, thereby further improving the firmness of the connection between the second substrate 16 and the fourth substrate 18.

With continued reference to FIG. 17, optionally, a first gap 36 exists between a vertical projection of the third groove 34 on the second substrate 16 and a vertical projection of the microstrip line 11 on the second substrate 16, where the first gap 36 has a distance D2 and D2≥200 μm.

As shown in FIG. 17, the first gap 36 is configured to exist between the vertical projection of the third groove 34 on the second substrate 16 and the vertical projection of the microstrip line 11 on the second substrate 16, where the first gap 36 has the distance D2 and D2≥200 μm. Thus, a distance between the third groove 34 and the microstrip line 11 is relatively long in the direction parallel to the plane where the first substrate 15 is located so as to reduce an influence of the third groove 34 on the radio frequency signal transmitted on the microstrip line 11, thereby helping improve the phase shift performance of the liquid crystal antenna.

Figure 18:
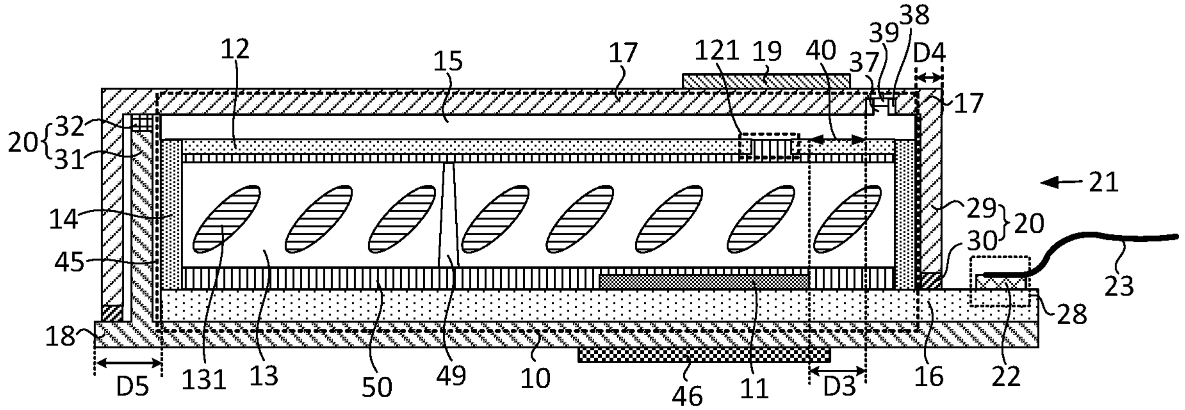
FIG. 18 is a sectional view showing part of another liquid crystal antenna according to an embodiment of the present disclosure.

FIG. 18 is a sectional view showing part of another liquid crystal antenna according to an embodiment of the present disclosure. As shown in FIG. 18, optionally, a second protrusion structure 37 is disposed on the side of the first substrate 15 facing the third substrate 17, and a fourth groove 38 corresponding to the second protrusion structure 37 is disposed on the side of the third substrate 17 facing the first substrate 15. A fifth adhesive layer 39 is disposed on a side of the second protrusion structure 37 facing away from the second substrate 16, and the second protrusion structure 37 is connected to a surface of a side of the fourth groove 38 facing the first substrate 15 through a fifth adhesive layer 39.

Exemplarily, as shown in FIG. 18, the second protrusion structure 37 and the corresponding fourth groove 38 are disposed on the first substrate 15 and the third substrate 17 respectively. The second protrusion structure 37 is accommodated in the fourth groove 38. The second protrusion structure 37 and the fourth groove 38 can function as the engaging positions so that the position of the liquid crystal cell 10 is more accurate. In addition, the relative movement between the first substrate 15 and the third substrate 17 can be avoided, thereby helping improve firmness of the connection between the first substrate 15 and the third substrate 17.

Further, as shown in FIG. 18, the fifth adhesive layer 39 is further disposed between the second protrusion structure 37 and the fourth groove 38 so that the second protrusion structure 37 adheres to the third groove 38 through the fifth adhesive layer 39, thereby further improving the firmness of the connection between the first substrate 15 and the third substrate 17.

With continued reference to FIG. 18, optionally, a second gap 40 exists between a vertical projection of the fourth groove 38 on the first substrate 15 and a vertical projection of the microstrip line 11 on the first substrate 15, where the second gap 40 has a distance D3 and D3≥200 μm.

As shown in FIG. 18, the second gap 40 is configured to exist between the vertical projection of the fourth groove 38 on the first substrate 15 and the vertical projection of the microstrip line 11 on the first substrate 15, where the second gap 40 has the distance D3 and D3≥200 μm. Thus, a distance between the fourth groove 38 and the microstrip line 11 is relatively long in the direction parallel to the plane where the first substrate 15 is located so as to reduce an influence of the fourth groove 38 on the radio frequency signal transmitted on the microstrip line 11, thereby helping improve the phase shift performance of the liquid crystal antenna.

It is to be noted that FIG. 17 merely illustrates an example in which the first protrusion structure 33 and the corresponding third groove 34 are disposed on the second substrate 16 and the fourth substrate 18 respectively, and the first protrusion structure 33 is accommodated in the third groove 34; and FIG. 18 merely illustrates an example in which the second protrusion structure 37 and the corresponding fourth groove 38 are disposed on the first substrate 15 and the third substrate 17 respectively, and the second protrusion structure 37 is accommodated in the fourth groove 38, which are not limited thereto. In other embodiments, the first protrusion structure 33 and the corresponding third groove 34 may be disposed on the second substrate 16 and the fourth substrate 18 respectively, and at the same time, the second protrusion structure 37 and the corresponding fourth groove 38 may be disposed on the first substrate 15 and the third substrate 17 respectively so that the position of the liquid crystal cell 10 is more accurate and the encapsulation firmness is further improved. Those skilled in the art may perform setting according to the actual requirements.

Figure 19:
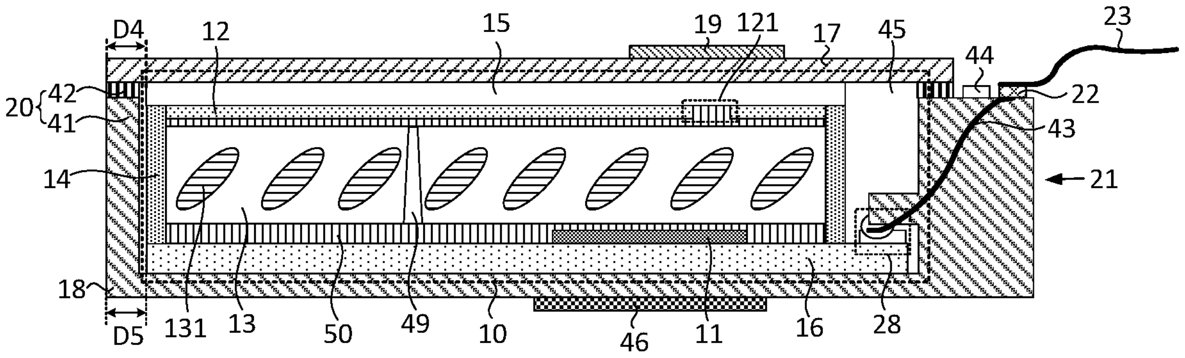
FIG. 19 is a sectional view showing part of another liquid crystal antenna according to an embodiment of the present disclosure.

FIG. 19 is a sectional view showing part of another liquid crystal antenna according to an embodiment of the present disclosure. As shown in FIG. 19, optionally, the connection structure 20 includes a third encapsulation sidewall 41 disposed on the fourth substrate 18 and around the liquid crystal cell 10; and the third substrate 17 at least partially overlaps the third encapsulation sidewall 41 along a thickness direction of the third substrate 17.

Exemplarily, as shown in FIG. 19, the connection structure 20 includes the third encapsulation sidewall 41 disposed around the liquid crystal cell 10 so that the whole liquid crystal cell 10 is encapsulated in a closed space formed by the third substrate 17, the fourth substrate 18 and the third encapsulation sidewall 41. In this case, the third encapsulation sidewall 41 is disposed on a side of the bonding connection region 28 facing away from the frame glue 14. Thus, the overall encapsulation of the liquid crystal antenna is implemented, and in addition, the sealing degree of the encapsulation can be further improved, thereby further reducing the influence of the harsh external environment on the performance of the liquid crystal antenna.

With continued reference to FIG. 19, optionally, the third encapsulation sidewall 41 and the fourth substrate 18 are the integrated structure so that the third substrate 17 and the fourth substrate 18 can be combined directly. Thus, the sealing performance is improved and no first adhesive layers 27 need be disposed between the third substrate 17 and the first substrate 15 and between the second substrate 16 and the fourth substrate 18, thereby avoiding the influence of the first adhesive layer 27 on the radio frequency signal, reducing the additional loss of the radio frequency signal, and improving the performance of the liquid crystal antenna. In addition, the encapsulation structure is the overall structure viewed from the outside, the structure is more reliable, and the overall space occupied is smaller (the full encapsulation).

With continued reference to FIG. 19, optionally, the connection structure 20 further includes a third adhesive layer 42 disposed on a side of the third encapsulation sidewall 41 facing the third substrate 17. The third encapsulation sidewall 41 is connected to the third substrate 17 through the third adhesive layer 42.

Exemplarily, as shown in FIG. 19, the connection structure 20 includes the third encapsulation sidewall 41 and the third adhesive layer 42. The third encapsulation sidewall 41 adheres to the third substrate 17 through the third adhesive layer 42, thereby fixing the third substrate 17, the fourth substrate 18, and the liquid crystal cell 10 together and implementing the overall encapsulation of the liquid crystal antenna.

FIG. 20 is a sectional view showing part of another liquid crystal antenna according to an embodiment of the present disclosure. As shown in FIG. 20, optionally, the third encapsulation sidewall 41 includes an engaging portion 411 disposed around the third substrate 17.

Exemplarily, as shown in FIG. 20, the engaging portion 411 is disposed around the third substrate 17 so as to function as the engaging position so that the third substrate 17 is engaged by the engaging portion 411. Thus, the third substrate 17 does not move relative to the fourth substrate 18 in the direction parallel to the plane where the first substrate 15 is located, thereby helping improve the firmness of a connection between the third substrate 17 and the fourth substrate 18 and improving the reliability of the overall liquid crystal antenna.

Optionally, as shown in FIG. 20, a surface of a side of the engaging portion 411 facing away from the first substrate 15 and a surface of a side of the third substrate 17 facing away from the first substrate 15 are disposed in the same plane. That is, the engaging portion 411 has an upper surface which is flush with an upper surface of the third substrate 17, thereby making an appearance of the liquid crystal antenna more beautiful while functioning as the engaging position.

With continued reference to FIGS. 19 and 20, optionally, the bonding terminal 22 is disposed on a side of the third encapsulation sidewall 41 facing away from the liquid crystal cell 10. A conductive structure 43 is disposed in the third encapsulation sidewall 41. The bonding terminal 22 is electrically connected to the bonding connection region 28 through the conductive structure 43.

Exemplarily, as shown in FIGS. 19 and 20, since the third encapsulation sidewall 41 is disposed on the side of the bonding connection region 28 facing away from the frame glue 14, the bonding connection region 28 cannot be directly bonded to the FPC 23. In this embodiment, the bonding terminal 22 is disposed on a surface of the side of the third encapsulation sidewall 41 facing away from the liquid crystal cell 10, and the conductive structure 43 is disposed in the third encapsulation sidewall 41. Thus, the bonding terminal 22 is electrically connected to the bonding connection region 28 through the conductive structure 43 so that the liquid crystal cell 10 receives a driving voltage signal provided by an external circuit 44.

Specifically, as shown in FIGS. 19 and 20, the bonding terminal 22 is disposed on the bonding side 21 of the liquid crystal cell 10 and on the surface of the side of the third encapsulation sidewall 41 facing away from the liquid crystal cell 10. The bonding terminal 22 is configured to be bonded to the FPC 23, and the FPC 23 may be connected to the external circuit 44, thereby implementing a connection between the bonding terminal 22 and the external circuit 44.

Further, the microstrip line 11 is correspondingly connected to the driving voltage signal transmission line 24 which may be configured to extend to the bonding connection region 28. The conductive structure 43 disposed in the third encapsulation sidewall 41 is welded to the driving voltage signal transmission line 24 extending to the bonding connection region 28 so as to implement a connection between the conductive structure 43 and the microstrip line 11. In addition, the conductive structure 43 is connected to the bonding terminal 22 so that the microstrip line 11 receives the driving voltage signal provided by the external circuit 44. Thus, the liquid crystal molecules 131 in the liquid crystal layer 13 are driven to deflect, the phase adjusted in the phase shift process of the radio frequency signal is controlled, and finally the beam-pointing direction of the radio frequency signal transmitted by the liquid crystal antenna is controlled.

It is to be noted that the external circuit 44 may be a driver integrated circuit (IC) or another IC. As shown in FIGS. 19 and 20, the external circuit 44 may be disposed on the surface of the side of the third encapsulation sidewall 41 facing away from the liquid crystal cell 10 or may be disposed at another position. Those skilled in the art may dispose the external circuit 44 according to the actual requirements, which is not limited in the embodiments of the present disclosure.

Optionally, the conductive structure 43 in the third encapsulation sidewall 41 may be implemented through a process of a rigid-flex board (like an FPC), which is not limited thereto. Those skilled in the art may perform setting according to the actual requirements.

In this embodiment, the bonding connection region 28 is disposed in the third encapsulation sidewall 41 and the microstrip line 11 is connected to the external circuit 44 through the conductive structure 43 in the third encapsulation sidewall 41 so that an overall encapsulation structure may be strengthened and the operation and use of the liquid crystal antenna are more reliable in a special environment.

With continued reference to FIGS. 14 to 20, optionally, the third substrate 17, the fourth substrate 18, and the connection structure 20 form a closed space 45 in which a vacuum environment exists.

As shown in FIGS. 14 to 20, the encapsulation and combination are performed by sealing and nesting the third substrate 17 and the fourth substrate 18 to each other so that the sealing performance of the liquid crystal antenna can be ensured. In this case, the third substrate 17, the fourth substrate 18, and the connection structure 20 form the closed space 45. The closed space 45 is configured to be the vacuum environment and the liquid crystal cell 10 works in the vacuum environment so that the radio frequency signal is coupled in the vacuum environment with a smaller loss, thereby improving the performance of the liquid crystal antenna.

With continued reference to FIGS. 8 to 13, optionally, the connection structure 20 includes the encapsulant which covers the bonding connection region 28.

The encapsulant is configured to cover the bonding connection region 28 so as to seal and protect the bonding connection region 28, thereby improving the reliability of a connection between the bonding connection region 28 and the external circuit and further improving the reliability of the overall liquid crystal antenna.

Optionally, the third substrate 17 includes a glass substrate or a printed circuit board (PCB) substrate, and the fourth substrate 18 includes a glass substrate or a PCB substrate.

The third substrate 17 and/or the fourth substrate 18 may be the glass substrate. Relatively high manufacturing accuracy may be obtained through the glass substrate. In addition, the glass substrate has relatively high transparency so that the liquid crystal antenna can have a more beautiful appearance.

Optionally, the third substrate 17 and/or the fourth substrate 18 may also be the PCB substrate which is conducive to the arrangement of a circuit. The PCB substrate may include a high-frequency substrate which is a special circuit board having a relatively high electromagnetic frequency more than 1 GHz. The high-frequency substrate with the small loss is used so that a loss caused by the PCB substrate to the radio frequency signal can be effectively reduced, thereby improving using performance of an antenna.

It is to be noted that the third substrate 17 and/or the fourth substrate 18 are not limited to the preceding materials. In other embodiments, those skilled in the art can set the materials of the third substrate 17 and/or the fourth substrate 18 according to the actual requirements. For example, high-frequency substrates are used such as an FR-4 epoxy glass cloth laminate, a polytetrafluoroethylene plate, and a hot-pressed ceramic plate, or other flexible substrates are used, which is not limited in the embodiments of the present disclosure.

Optionally, the first substrate 15 includes the glass substrate, the second substrate 16 includes the glass substrate, the third substrate 17 includes the PCB substrate, and the fourth substrate 18 includes the PCB substrate.

The first substrate 15 and the second substrate 16 are glass substrates. Since the glass substrate has good light transmittance, when the first substrate 15 and the second substrate 16 are aligned to form a cell, the accurate alignment of the first substrate 15 and the second substrate 16 is facilitated, thereby ensuring phase shift performance of the liquid crystal cell 10.

Further, the third substrate 17 and the fourth substrate 18 are PCB substrates. The PCB substrate has a lower dielectric constant and a smaller dielectric loss than the glass substrate. Therefore, the third substrate 17 and the fourth substrate 18 are the PCB substrates, which is conducive to improving the performance of the liquid crystal antenna applied in an ultra-high band.

It is to be noted that in the case there the third substrate 17 and the fourth substrate 18 are the PCB substrates, it is difficult to cut the PCB substrates. Therefore, the liquid crystal antenna can be prepared with small-size substrates so as to reduce times of cutting the PCB substrates.

With continued reference to FIGS. 10 to 20, optionally, the liquid crystal antenna provided by the embodiments of the present disclosure further includes the feed structure 46 coupled to the microstrip line 11. The feed structure 46 is disposed on the side of the fourth substrate 18 facing away from the third substrate 17. The vertical projection of the feed structure 46 on the fourth substrate 18 covers the vertical projection of the microstrip line 11 on the fourth substrate 18.

Exemplarily, as shown in FIGS. 10 to 20, the feed structure 46 is disposed on the side of the fourth substrate 18 facing away from the third substrate 17 and the feed structure 46 is coupled to the microstrip line 11. The feed structure 46 is configured to transmit the radio frequency signal to the microstrip line 11 and has the function of starting vibration. Along a thickness direction of the first substrate 15, the feed structure 46 covers the microstrip line 11 so that the radio frequency signal transmitted on the feed structure 46 can be coupled to the microstrip line 11. The deflection of the liquid crystal molecules 131 in the liquid crystal layer 13 is controlled so as to change the dielectric constant of the liquid crystal layer 13. Thus, the phase shift of the radio frequency signal on the microstrip line 11 is implemented.

In this embodiment, the feed structure 46 is disposed on the side of the fourth substrate 18 facing away from the third substrate 17 so that during the preparation of the liquid crystal antenna, the microstrip line 11 may be formed on the second substrate 16, the feed structure 46 may be formed on the fourth substrate 18, and then the second substrate 16 and the fourth substrate 18 are combined. The preparation of the microstrip line 11 and the feed structure 46 can be implemented without the double-sided patterning process, resulting in the simple process, the small loss of consumable materials, the low cost, the high yield, and the easy mass production.

With continued reference to FIGS. 1, 2, 7, and 8, optionally, the feed structure 46 and the radiation electrode 19 are disposed in the same layer.

Exemplarily, as shown in FIGS. 1, 2, 7, and 8, the feed structure 46 and the radiation electrode 19 are disposed in the same layer, the feed structure 46 is coupled to the microstrip line 11, and the feed structure 46 is configured to transmit the radio frequency signal to each microstrip line 11. The feed structure 46 may be distributed in an arborescent shape and include multiple branches, and one branch provides the radio frequency signal for one microstrip line 11.

As shown in FIGS. 1, 2, 7 and 8, the ground metal layer 12 includes a second hollow portion 122. A vertical projection of the feed structure 46 on the first substrate 15 covers a vertical projection of the second hollow portion 122 on the first substrate 15. The radio frequency signal transmitted by the feed structure 46 is coupled to the microstrip line 11 at the second hollow portion 122 of the ground metal layer 12. The deflection of the liquid crystal molecules 131 in the liquid crystal layer 13 is controlled so as to change the dielectric constant of the liquid crystal layer 13. Thus, the phase shift of the radio frequency signal on the microstrip line 11 is implemented.

With continued reference to FIGS. 2 and 8, optionally, the liquid crystal antenna provided by the embodiments of the present disclosure further includes a radio frequency signal interface 47 and a pad 48. One end of the radio frequency signal interface 47 is connected to the feed structure 46 and fixed through the pad 48. The other end of the radio frequency signal interface 47 is configured to be connected to the external circuit such as a coaxial cable connector so as to feed in the radio frequency signal.

In other embodiments, the feed structure 46 and the microstrip line 11 may also be disposed in the same layer and the feed structure 46 is coupled to the microstrip line 11, which may be set by those skilled in the art according to the actual requirements and is not limited in the embodiments of the present disclosure.

With continued reference to FIGS. 2, 4, and 8 to 20, optionally, along the direction parallel to the first substrate 15, a shortest distance between an edge of a vertical projection of the first substrate 15 on the third substrate 17 and an edge of the third substrate 17 is D4, and a shortest distance between an edge of a vertical projection of the first substrate 15 on the fourth substrate 18 and an edge of the fourth substrate 18 is D5, where $D4 \geq 0.2$ mm and $D5 \geq 0.2$ mm.

As shown in FIGS. 2, 4, and 8 to 20, in the direction parallel to the plane where the first substrate 15 is located, the third substrate 17 is configured to extend beyond the first substrate 15 by at least 0.2 mm, and the fourth substrate 18 is configured to extend beyond the first substrate 15 by at least 0.2 mm so that a space of at least 0.2 mm is provided on the side surface of the liquid crystal cell 10 to dispose the connection structure 20. Thus, the contact area between the connection structure 20 and the third substrate 17 and the contact area between the connection structure 20 and the fourth substrate 18 are ensured, thereby ensuring the encapsulation firmness of the liquid crystal antenna.

It is to be noted that those skilled in the art may set materials of structures such as the microstrip line 11, the ground metal layer 12, the radiation electrode 19, and the feed structure 46 according to the actual requirements. For example, the preceding structures may be made of copper (Cu) which is the most commonly used metal material in the antenna field and has excellent conductivity and a low cost. The use of the copper material can effectively reduce an energy loss due to a high resistance, thereby improving using performance of the liquid crystal antenna, which is not limited thereto. In other embodiments, metal materials such as silver and gold may also be used, which is not limited in the embodiments of the present disclosure.

With continued reference to FIGS. 2 and 8 to 20, optionally, the liquid crystal antenna provided by the embodiments of the present disclosure further includes a support 49 disposed between the first substrate 15 and the second substrate 16. The support 49 is disposed between the first substrate 15 and the second substrate 16 so that the first substrate 15 and the second substrate 16 can be supported. Thus, during the alignment of the cell, uniformity of the thickness of the cell at each position is maintained using uniformity of the dimension of the support 49.

With continued reference to FIGS. 2 and 8 to 20, optionally, the support 49 includes a photo spacer (PS). In other embodiments, the support 49 may also be a ball spacer (BS). Those skilled in the art may set the shape, number, position, and preparation process of the support 49 according to the actual requirements, which is not limited in the embodiments of the present disclosure.

With continued reference to FIGS. 2 and 8 to 20, optionally, the liquid crystal antenna provided by the embodiments of the present disclosure further includes an alignment layer 50 disposed on a side of the microstrip line 11 facing the liquid crystal layer 13. The alignment layer 50 is also disposed on a side of the ground metal layer 12 facing the liquid crystal layer 13.

As shown in FIGS. 2 and 8 to 20, the alignment layer 50 is disposed on the side of the microstrip line 11 facing the liquid crystal layer 13 and on the side of the ground metal layer 12 facing the liquid crystal layer 13 so that the alignment layer 131 provides a pretilt angle to each liquid crystal molecule 131 in the liquid crystal layer 13 for aligning the liquid crystal layer 13. Thus, under the action of an applied electric field, the liquid crystal molecule 131 can be rapidly deflected in response to the electric field, thereby improving a response speed of the liquid crystal antenna.

Based on the same inventive concept, the embodiments of the present disclosure further provide a preparation method of a liquid crystal antenna for preparing any liquid crystal antenna provided by the preceding embodiments. The same or corresponding structure and the explanation of terms as those in the preceding embodiments will not be repeated here. FIG. 21 is a flowchart of a preparation method of a liquid crystal antenna according to an embodiment of the present disclosure. As shown in FIG. 21, the method includes the steps described below.

In S110, a liquid crystal cell is prepared. The liquid crystal cell includes frame glue, a microstrip line, a ground metal layer, a liquid crystal layer, and a first substrate and a second substrate disposed opposite to each other. The microstrip line is disposed on a side of the second substrate facing the first substrate. The ground metal layer is disposed on a side of the first substrate facing the second substrate. The liquid crystal layer is disposed between the first substrate and the second substrate. The frame glue is disposed between the first substrate and the second substrate, and the frame glue is disposed around the liquid crystal layer.

Figure 22:
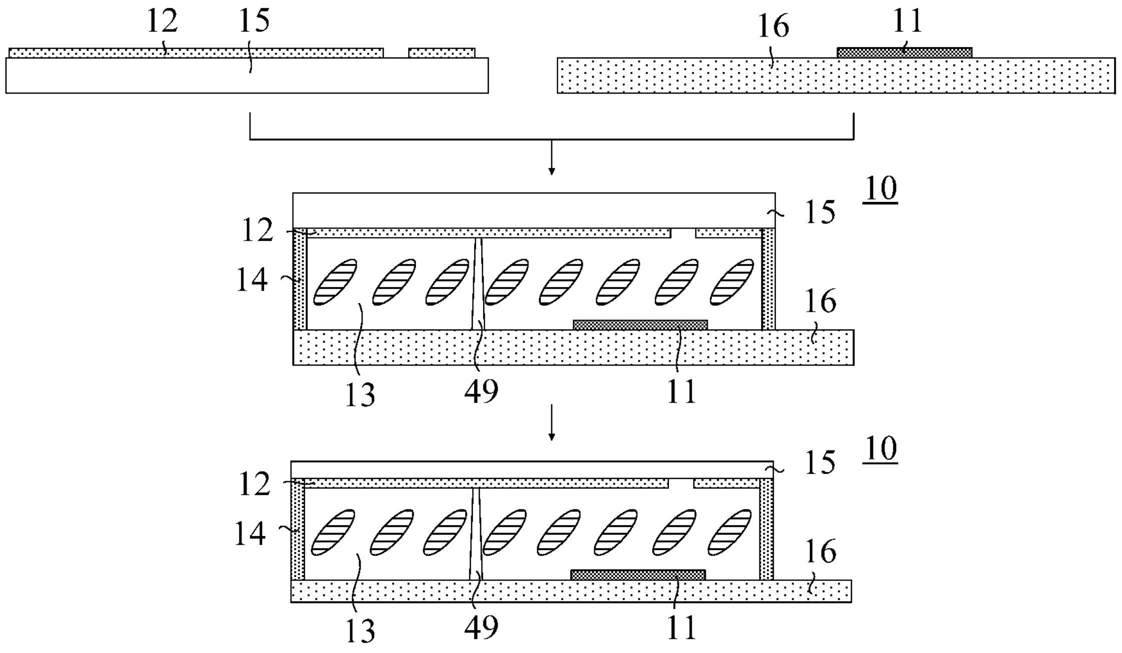
FIG. 22 is a schematic diagram showing a process of a preparation method of a liquid crystal cell according to an embodiment of the present disclosure.

FIG. 22 is a schematic diagram showing a process of a preparation method of a liquid crystal cell according to an embodiment of the present disclosure. As shown in FIG. 22, exemplarily, a ground metal layer 12 is prepared on a side of a first substrate 15, a microstrip line 11 is prepared on a side of a second substrate 16, and then a cell forming operation is performed on the first substrate 15 and the second substrate 16 so that a liquid crystal cell 10 is formed. A liquid crystal layer 13 is filled into the liquid crystal cell 10. Frame glue 14 is disposed between the first substrate 15 and the second substrate 16, and the frame glue 14 is disposed around the liquid crystal layer 13 to support the first substrate 15 and the second substrate 16 and provide an accommodation space for the liquid crystal layer 13.

With continued reference to FIG. 22, optionally, after the liquid crystal cell 10 is formed, the first substrate 15 and the second substrate 16 may be further thinned to reduce an overall structure dimension, further meet needs for manufacturing a high-frequency antenna, and reduce a cross-sectional dimension of the liquid crystal antenna.

With continued reference to FIG. 22, optionally, when the liquid crystal cell 10 is formed, a support 49 may also be disposed between the first substrate 15 and the second substrate 16 so that the first substrate 15 and the second substrate 16 can be supported. Thus, during the alignment of the cell, uniformity of the thickness of the cell at each position is maintained using uniformity of the dimension of the support 49.

In S120, a third substrate and a fourth substrate are provided and a radiation electrode is prepared on a side of the third substrate.

The radiation electrode is prepared on the side of the third substrate. Thus, the preparation of the radiation electrode can be implemented without a double-sided patterning process, resulting in a simple process, a small loss of consumable materials, a low cost, a high yield, and easy mass production.

In S130, the third substrate, the fourth substrate, and the liquid crystal cell are combined to form a liquid crystal antenna. The third substrate is disposed on a side of the first substrate facing away from the second substrate. The fourth substrate is disposed on a side of the second substrate facing away from the third substrate. The radiation electrode is disposed on a side of the third substrate facing away from the fourth substrate. The third substrate extends beyond an edge of the first substrate. The fourth substrate extends beyond edges of the second substrate on at least two sides. A connection structure is disposed between the third substrate and the fourth substrate. The connection structure is disposed on an outer side of the frame glue.

The third substrate, the fourth substrate, and the liquid crystal cell are combined to form the liquid crystal antenna. Along a direction parallel to the plane where the first substrate is located, the third substrate extends beyond the edge of the first substrate, and the fourth substrate extends beyond the edges of the second substrate on the at least two sides. Thus, a fixing space is provided on the outer side of the frame glue for the connection structure so that the connection structure fixes the third substrate, the fourth substrate, and the liquid crystal cell on a side surface of the liquid crystal cell.

Further, the connection structure is disposed around the frame glue. On the one hand, the liquid crystal cell, the third substrate, and the fourth substrate are adhered together from the side surface of the liquid crystal cell, thereby assembling the liquid crystal cell, the third substrate, and the fourth substrate. On the other hand, the overall encapsulation of the liquid crystal antenna can be implemented so that a microstrip line array structure in the liquid crystal cell can be effectively protected, thereby resisting an influence of a bad external environment, ensuring phase shift performance of the liquid crystal antenna, and improving reliability of the liquid crystal antenna.

It is to be noted that when the third substrate, the fourth substrate, and the liquid crystal cell are combined, the third substrate and the fourth substrate are respectively placed at corresponding positions of the liquid crystal cell, and then the connection structure is formed on sidewalls of the liquid crystal cell so that the connection structure is in contact with the sidewalls of the first substrate and the second substrate. Thus, a fixing force to the first substrate and the second substrate is increased and the liquid crystal cell does not move relative to the third substrate and the fourth substrate, thereby improving stability of the liquid crystal antenna.

For example, the sidewalls of the liquid crystal cell are directly coated with adhesive layers to manufacture the connection structure. In this case, the sidewalls of the liquid crystal cell may have a positioning function. Multiple coatings are directly performed along the sidewalls of the liquid crystal cell to form the connection structure, which is less difficult to manufacture and does not reduce an overall yield.

Further, the connection structure may also be in contact with the sidewall of the frame glue facing away from the liquid crystal layer so that the fixing force for the liquid crystal cell can be further increased. Thus, the liquid crystal cell does not shake between the third substrate and the fourth substrate, thereby improving the stability of the liquid crystal antenna.

It is to be understood that if the connection structure is manufactured by directly coating the sidewalls of the liquid crystal cell with adhesive layers, whether the connection structure is in contact with the sidewall of the frame glue facing away from the liquid crystal layer depends on a relative positional relationship between the frame glue and the first substrate and a relative positional relationship between the frame glue and the second substrate. When the frame glue is closer to the edges of the first substrate and the second substrate, it is easier for a connection structure 20 to be in contact with the sidewall of the frame glue facing away from the liquid crystal layer.

According to the preparation method of the liquid crystal antenna provided by the embodiments of the present disclosure, the liquid crystal cell, the third substrate, and the fourth substrate are respectively manufactured and combined to manufacture the liquid crystal antenna, and in addition, the connection structure is added around the liquid crystal cell, thereby implementing the overall encapsulation and reducing manufacturing difficulty of the liquid crystal antenna. The preparation method of the liquid crystal antenna may be compatible with the existing manufacturing process to the maximum extent. The manufacturing process is simple and mature, an overall manufacturing cost is reduced, and an encapsulation structure formed can also effectively protect the internal liquid crystal cell and reduce an influence of the harsh external environment on working performance of the liquid crystal antenna.

Optionally, one side of the liquid crystal cell is a bonding side, and the second substrate extends beyond the edge of the first substrate on the bonding side; and the second substrate includes a bonding connection region disposed on the bonding side of the liquid crystal cell, the bonding connection region is electrically connected to the microstrip line, and the bonding connection region is connected to an external circuit.

Before the third substrate, the fourth substrate, and liquid crystal cell are combined, the method further includes the step described below.

A first encapsulation sidewall is formed on a side of the third substrate facing away from the radiation electrode.

The step in which the third substrate, the fourth substrate, and the liquid crystal cell are combined to form the liquid crystal antenna includes the step described below.

The first encapsulation sidewall is connected to the second substrate and the fourth substrate separately through a second adhesive layer so that the liquid crystal antenna is formed. The first encapsulation sidewall is disposed around the frame glue, and the bonding connection region is disposed on a side of the first encapsulation sidewall facing away from the frame glue.

Figure 23:
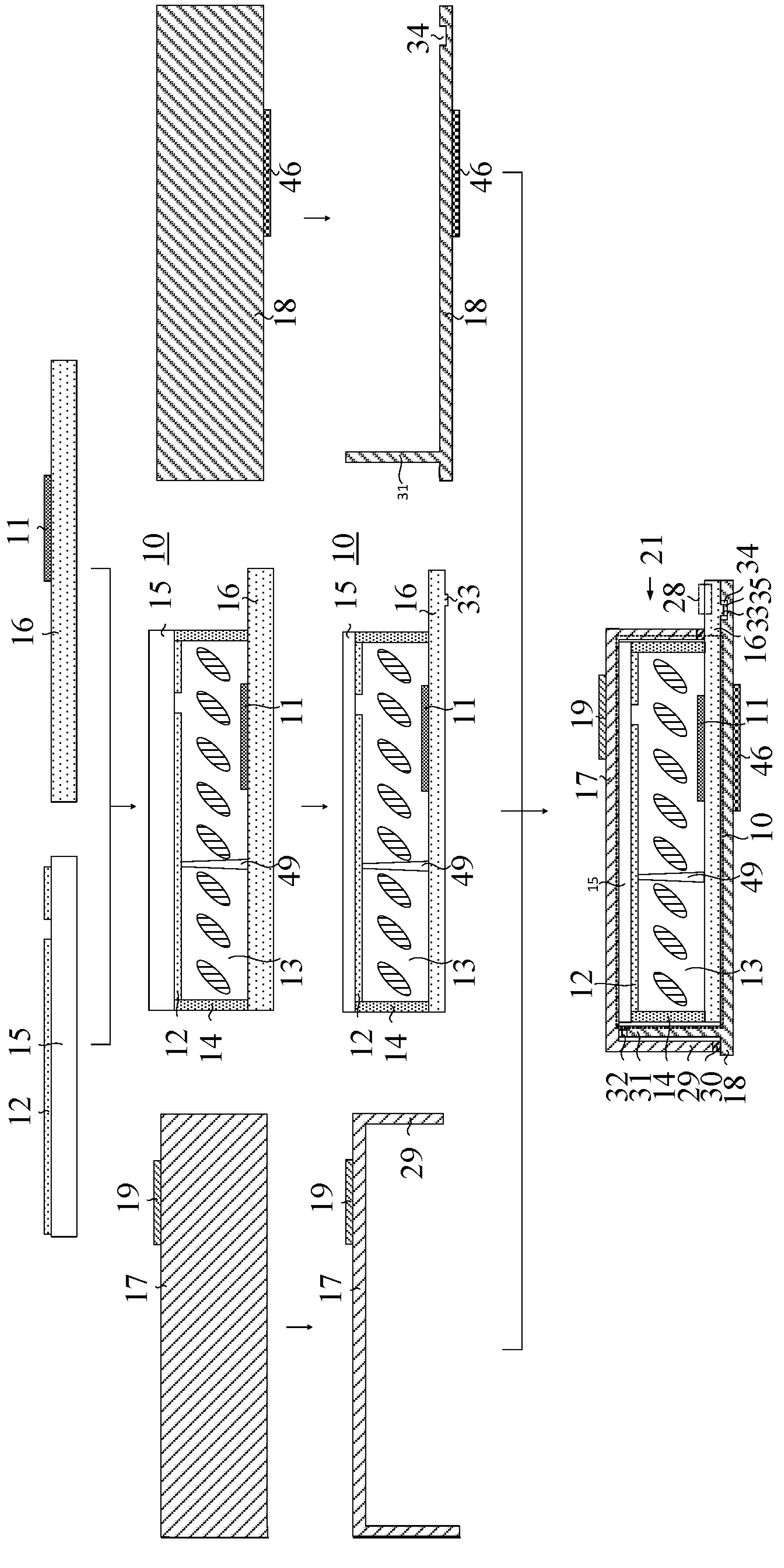
FIG. 23 is a schematic diagram showing a process of a preparation method of a liquid crystal antenna according to an embodiment of the present disclosure.

Exemplarily, FIG. 23 is a schematic diagram showing a process of a preparation method of a liquid crystal antenna according to an embodiment of the present disclosure. As shown in FIG. 23, exemplarily, the ground metal layer 12 may be prepared on the side of the first substrate 15, the microstrip line 11 may be prepared on the side of the second substrate 16, and then the cell forming operation is performed on the first substrate 15 and the second substrate 16 so that the liquid crystal cell 10 is formed. The liquid crystal layer 13 is filled into the liquid crystal cell 10. The frame glue 14 is disposed between the first substrate 15 and the second substrate 16, and the frame glue 14 is disposed around the liquid crystal layer 13 to support the first substrate 15 and the second substrate 16 and provide the accommodation space for the liquid crystal layer 13.

With continued reference to FIG. 23, optionally, after the liquid crystal cell 10 is formed, the first substrate 15 and the second substrate 16 may be further thinned to reduce the overall structure dimension, further meet the needs for manufacturing the high-frequency antenna, and reduce the cross-sectional dimension of the liquid crystal antenna.

With continued reference to FIG. 23, optionally, when the liquid crystal cell 10 is formed, the support 49 may also be disposed between the first substrate 15 and the second substrate 16 so that the first substrate 15 and the second substrate 16 can be supported. Thus, during the alignment of the cell, the uniformity of the thickness of the cell at each position is maintained using the uniformity of the dimension of the support 49.

With continued reference to FIG. 23, the radiation electrode 19 may be prepared on a side of a third substrate 17, and then a groove is made on a side of the third substrate 17 facing away from the radiation electrode 19 so that a first encapsulation sidewall 29 is formed.

With continued reference to FIG. 23, a feed structure 46 may be prepared on a side of a fourth substrate 18, and then the third substrate 17, the fourth substrate 18, and the liquid crystal cell 10 are combined. Specifically, the first encapsulation sidewall 29 may be connected to the second substrate 16 and the fourth substrate 18 separately through a second adhesive layer 30 so that the liquid crystal antenna is formed. One side of the liquid crystal cell 10 is a bonding side 21, and the second substrate 16 extends beyond an edge of the first substrate 15 on the bonding side 21; and the second substrate 16 includes a bonding connection region 28 disposed on the bonding side 21 of the liquid crystal cell 10, the bonding connection region 28 is electrically connected to the microstrip line 11, and the bonding connection region 28 is connected to the external circuit. The first encapsulation sidewall 29 is disposed around the frame glue 14 and the bonding connection region 28 is disposed on a side of the first encapsulation sidewall 29 facing away from the frame glue 14.

With continued reference to FIG. 23, optionally, when the first substrate 15 and the second substrate 16 are thinned, a first protrusion structure 33 may be formed at the same time on a side of the second substrate 16 facing away from the microstrip line 11. Of course, in other embodiments, a second protrusion structure may also be disposed on a side of the first substrate 15 facing away from the ground metal layer 12, which is not limited in the embodiments of the present disclosure.

Further, after the feed structure 46 is prepared on the side of the fourth substrate 18, a groove may also be made on a side of the fourth substrate 18 facing away from the feed structure 46 so as to form a third groove 34 corresponding to the first protrusion structure 33.

With continued reference to FIG. 23, when the third substrate 17, the fourth substrate 18, and the liquid crystal cell 10 are combined, the first protrusion structure 33 adheres to the third groove 34 through a fourth adhesive layer 35 so as to improve firmness of a connection between the second substrate 16 and the fourth substrate 18.

Optionally, before the third substrate, the fourth substrate, and the liquid crystal cell are combined, the method further includes the step described below.

A second encapsulation sidewall is formed on a side of the fourth substrate.

The step in which the third substrate, the fourth substrate, and the liquid crystal cell are combined to form the liquid crystal antenna includes the step described below.

The second encapsulation sidewall is connected to the third substrate through a third adhesive layer so that the liquid crystal antenna is formed. The second encapsulation sidewall is disposed on another side of the liquid crystal cell other than the bonding side, and the second encapsulation sidewall is disposed on a side of the frame glue facing away from the liquid crystal layer.

With continued reference to FIG. 23, the feed structure 46 may be prepared on the side of the fourth substrate 18, and then the groove is made on the side of the fourth substrate 18 facing away from the feed structure 46 so that a second encapsulation sidewall 31 is formed.

Then the third substrate 17, the fourth substrate 18, and the liquid crystal cell 10 are combined. Specifically, the second encapsulation sidewall 31 is connected to the third substrate 17 through a third adhesive layer 32 so that the liquid crystal antenna is formed. The second encapsulation sidewall 31 is disposed on another side of the liquid crystal cell 10 other than the bonding side 21, and the second encapsulation sidewall 31 is disposed on a side of the frame glue 14 facing away from the liquid crystal layer 13.

The groove is made on the side of the third substrate 17 facing away from the radiation electrode 19 so that the first encapsulation sidewall 29 is formed. The groove is made on the side of the fourth substrate 18 facing away from the feed structure 46 so that the second encapsulation sidewall 31 is formed. Thus, the encapsulation and combination are performed by sealing and nesting the third substrate 17 and the fourth substrate 18 to each other so that sealing performance of the liquid crystal antenna is ensured.

Optionally, one side of the liquid crystal cell is the bonding side, and the second substrate extends beyond the edge of the first substrate on the bonding side; and the second substrate includes the bonding connection region disposed on the bonding side of the liquid crystal cell, the bonding connection region is electrically connected to the microstrip line, and the bonding connection region is connected to the external circuit. Before the third substrate, the fourth substrate, and the liquid crystal cell are combined, the method further includes the step described below.

A third encapsulation sidewall is formed on the side of the fourth substrate.

The step in which the third substrate, the fourth substrate, and the liquid crystal cell are combined to form the liquid crystal antenna includes the step described below.

The third encapsulation sidewall is connected to the third substrate so that the liquid crystal antenna is formed. The third encapsulation sidewall is disposed around the liquid crystal cell, and the third substrate at least partially overlaps the third encapsulation sidewall along a thickness direction of the third substrate.

Figure 24:
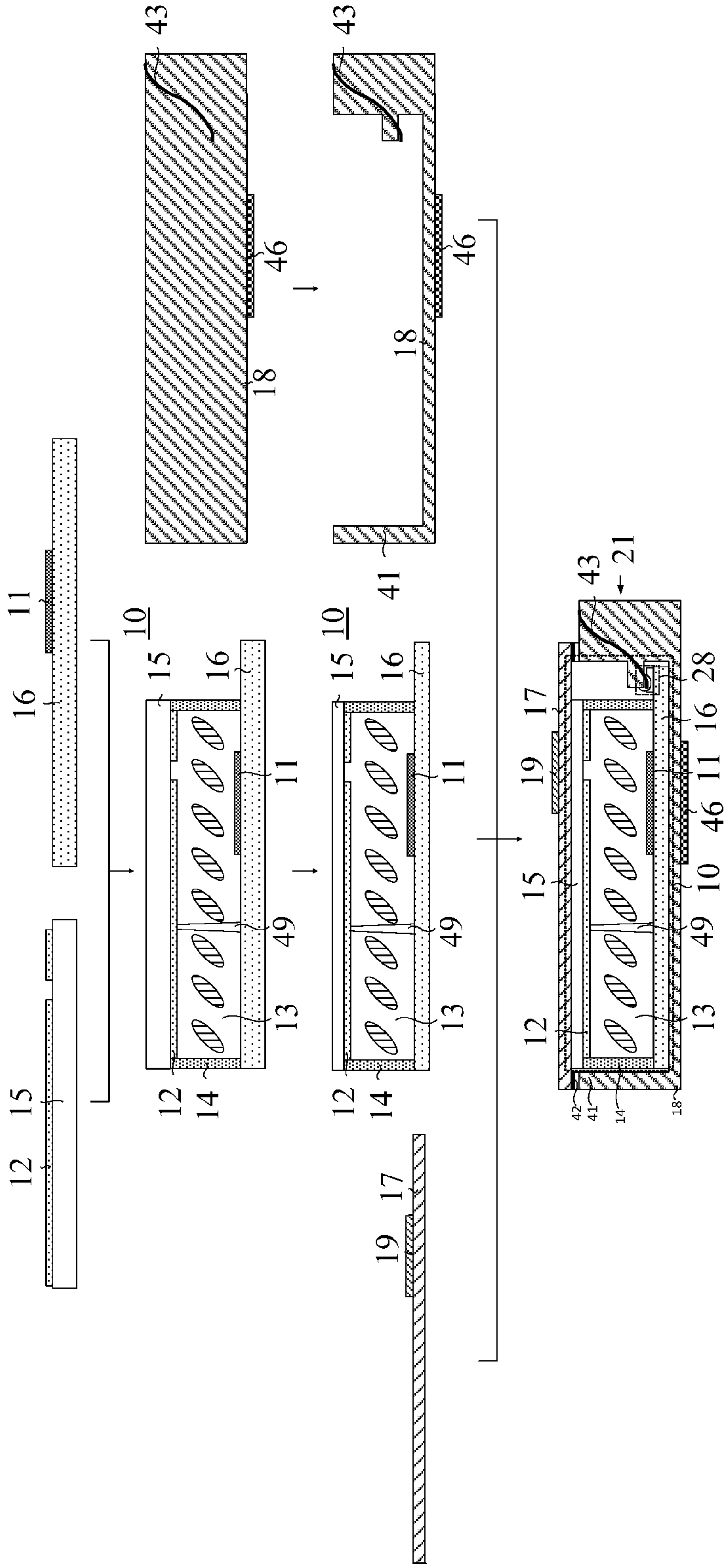
FIG. 24 is a schematic diagram showing a process of a preparation method of another liquid crystal antenna according to an embodiment of the present disclosure.

Exemplarily, FIG. 24 is a schematic diagram showing a process of a preparation method of another liquid crystal antenna according to an embodiment of the present disclosure. As shown in FIG. 24, the ground metal layer 12 may be prepared on the side of the first substrate 15, the microstrip line 11 may be prepared on the side of the second substrate 16, and then the cell forming operation is performed on the first substrate 15 and the second substrate 16 so that the liquid crystal cell 10 is formed. The liquid crystal layer 13 is filled into the liquid crystal cell 10. The frame glue 14 is disposed between the first substrate 15 and the second substrate 16, and the frame glue 14 is disposed around the liquid crystal layer 13 to support the first substrate 15 and the second substrate 16 and provide the accommodation space for the liquid crystal layer 13.

With continued reference to FIG. 24, optionally, after the liquid crystal cell 10 is formed, the first substrate 15 and the second substrate 16 may be further thinned to reduce the overall structure dimension, further meet the needs for manufacturing the high-frequency antenna, and reduce the cross-sectional dimension of the liquid crystal antenna.

With continued reference to FIG. 24, optionally, when the liquid crystal cell 10 is formed, the support 49 may be disposed between the first substrate 15 and the second substrate 16 so that the first substrate 15 and the second substrate 16 can be supported. Thus, during the alignment of the cell, the uniformity of the thickness of the cell at each position is maintained using the uniformity of the dimension of the support 49.

With continued reference to FIG. 24, the radiation electrode 19 may be prepared on the side of the third substrate 17, the feed structure 46 may be prepared on the side of the fourth substrate 18, and then the groove is made on the side of the fourth substrate 18 facing away from the feed structure 46 so that a third encapsulation sidewall 41 is formed.

Then the third substrate 17, the fourth substrate 18, and the liquid crystal cell 10 are combined. Specifically, the third encapsulation sidewall 31 is connected to the third substrate 17 so that the liquid crystal antenna is formed. The third encapsulation sidewall 41 is disposed around the liquid crystal cell 10, and the third substrate 17 at least partially overlaps the third encapsulation sidewall 41 along a thickness direction of the third substrate 17. One side of the liquid crystal cell 10 is the bonding side 21, and the second substrate 16 extends beyond the edge of the first substrate 15 on the bonding side 21; and the second substrate 16 includes the bonding connection region 28 disposed on the bonding side 21 of the liquid crystal cell 10, the bonding connection region 28 is electrically connected to the microstrip line 11, and the bonding connection region 28 is connected to the external circuit. The bonding connection region 28 is disposed on a side of the third encapsulation sidewall 41 facing the frame glue 14.

With continued reference to FIG. 24, optionally, when the fourth substrate 18 is prepared, a conductive structure 43 may be formed in the fourth substrate 18 through a process of a rigid-flex board (like an FPC). When the third substrate 17, the fourth substrate 18, and the liquid crystal cell 10 are combined, the conductive structure 43 is connected to the bonding connection region 28 by welding so as to implement the introduction of a driving voltage signal.

It is to be noted that the preceding are merely preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail through the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. A liquid crystal antenna, comprising:

a liquid crystal cell, wherein the liquid crystal cell comprises:
- a first substrate and a second substrate disposed opposite to each other;
- a microstrip line disposed on a side of the second substrate facing the first substrate;
- a ground metal layer disposed on a side of the first substrate facing the second substrate;
- a liquid crystal layer disposed between the first substrate and the second substrate; and
- frame glue disposed between the first substrate and the second substrate and around the liquid crystal layer;

a third substrate and a fourth substrate, wherein the third substrate is disposed on a side of the first substrate facing away from the second substrate, and the fourth substrate is disposed on a side of the second substrate facing away from the third substrate; and a radiation electrode disposed on a side of the third substrate facing away from the fourth substrate, wherein the third substrate extends beyond an edge of the first substrate, the fourth substrate extends beyond edges of the second substrate on at least two sides, a connection structure is disposed between the third substrate and the fourth substrate, and the connection structure is disposed on an outer side of the frame glue.

2. The liquid crystal antenna according to claim 1, wherein one side of the liquid crystal cell is a bonding side, and the second substrate extends beyond an edge of the first substrate on the bonding side; and the connection structure is in contact with the third substrate and the fourth substrate separately on sides of the liquid crystal cell other than the bonding side.

3. The liquid crystal antenna according to claim 2, wherein the connection structure comprises an encapsulant.

4. The liquid crystal antenna according to claim 3, wherein a vertical projection of the encapsulant on a plane where the fourth substrate is located is within the fourth substrate.

5. The liquid crystal antenna according to claim 3, wherein the third substrate comprises a first groove and the first substrate is accommodated in the first groove;

and/or the fourth substrate comprises a second groove and the second substrate is accommodated in the second groove.

6. The liquid crystal antenna according to claim 2, wherein the second substrate comprises a bonding connection region disposed on the bonding side of the liquid crystal cell, the bonding connection region is electrically connected to the microstrip line, and the bonding connection region is connected to an external circuit.

7. The liquid crystal antenna according to claim 6, wherein the connection structure comprises a first encapsulation sidewall disposed on the third substrate and a second adhesive layer disposed on a side of the first encapsulation sidewall facing the fourth substrate;

the first encapsulation sidewall is disposed around the frame glue, and the bonding connection region is disposed on a side of the first encapsulation sidewall facing away from the frame glue; and the first encapsulation sidewall is connected to the second substrate and the fourth substrate separately through the second adhesive layer.

8. The liquid crystal antenna according to claim 7, wherein the connection structure further comprises a second encapsulation sidewall disposed on the fourth substrate and a third adhesive layer disposed on a side of the second encapsulation sidewall facing the third substrate;

the second encapsulation sidewall is disposed on another side of the liquid crystal cell other than the bonding side, and the second encapsulation sidewall is disposed on a side of the frame glue facing away from the liquid crystal layer; and the second encapsulation sidewall is connected to the third substrate through the third adhesive layer.

9. The liquid crystal antenna according to claim 8, wherein the second encapsulation sidewall is disposed on a side of the first encapsulation sidewall facing the frame glue; or the second encapsulation sidewall is disposed on the side of the first encapsulation sidewall facing away from the frame glue.

10. The liquid crystal antenna according to claim 6, wherein the connection structure comprises an encapsulant; and the encapsulant covers the bonding connection region.

11. The liquid crystal antenna according to claim 2, wherein along a direction parallel to the first substrate, a shortest distance between an edge of a vertical projection of the first substrate on the third substrate and an edge of the third substrate is D4, and a shortest distance between an edge of a vertical projection of the first substrate on the fourth substrate and an edge of the fourth substrate is D5, wherein D4≥0.2 mm and D5≥0.2 mm.

12. The liquid crystal antenna according to claim 1, wherein the connection structure is in contact with a sidewall of the liquid crystal cell.

13. The liquid crystal antenna according to claim 12, wherein the sidewall of the liquid crystal cell comprises a sidewall of the first substrate, a sidewall of the second substrate, and a sidewall of the frame glue facing away from the liquid crystal layer, and the connection structure is in contact with at least the sidewall of the first substrate and the sidewall of the second substrate.

14. The liquid crystal antenna according to claim 1, wherein the third substrate and the first substrate are connected through a first adhesive layer;

and/or the second substrate and the fourth substrate are connected through the first adhesive layer.

15. The liquid crystal antenna according to claim 14, wherein the first adhesive layer has a thickness D1, wherein 0.5 mm≤D1≤1 mm.

16. The liquid crystal antenna according to claim 1, wherein a surface of a side of the third substrate facing the first substrate is in contact with a surface of a side of the first substrate facing the third substrate;

and/or a surface of a side of the second substrate facing the fourth substrate is in contact with a surface of a side of the fourth substrate facing the second substrate.

17. The liquid crystal antenna according to claim 1, wherein a second protrusion structure is disposed on a side of the first substrate facing the third substrate, and a fourth groove corresponding to the second protrusion structure is disposed on a side of the third substrate facing the first substrate; and a fifth adhesive layer is disposed on a side of the second protrusion structure facing away from the second substrate, and the second protrusion structure is connected to a surface of a side of the fourth groove facing the first substrate through the fifth adhesive layer.

18. The liquid crystal antenna according to claim 17, wherein a second gap exists between a vertical projection of the fourth groove on the first substrate and a vertical projection of the microstrip line on the first substrate, wherein the second gap has a distance D3 and D3≥200 μm.

19. The liquid crystal antenna according to claim 1, wherein the third substrate comprises a glass substrate or a printed circuit board (PCB) substrate; and the fourth substrate comprises a glass substrate or a PCB substrate, wherein the first substrate comprises a glass substrate; the second substrate comprises a glass substrate; the third substrate comprises a PCB substrate; and the fourth substrate comprises a PCB substrate.

20. The liquid crystal antenna according to claim 1, wherein the liquid crystal antenna further comprises a feed structure coupled to the microstrip line; and the feed structure is disposed on a side of the fourth substrate facing away from the third substrate, and a vertical projection of the feed structure on the fourth substrate covers a vertical projection of the microstrip line on the fourth substrate.

* * * * *